United States Patent [19]

Sakata

[11] Patent Number: 5,013,141
[45] Date of Patent: May 7, 1991

[54] LIQUID CRYSTAL LIGHT MODULATION DEVICE

[75] Inventor: Hajime Sakata, Tokyo, Japan

[73] Assignee: Canon Kabushiki Kaisha, Tokyo, Japan

[21] Appl. No.: 391,621

[22] Filed: Aug. 1, 1989

Related U.S. Application Data

[63] Continuation of Ser. No. 831,525, Feb. 20, 1986, abandoned.

[30] Foreign Application Priority Data

| Feb. 21, 1985 | [JP] | Japan | 60-033281 |
|---|---|---|---|
| Feb. 21, 1985 | [JP] | Japan | 60-033282 |
| Feb. 21, 1985 | [JP] | Japan | 60-033283 |
| Feb. 21, 1985 | [JP] | Japan | 60-033284 |
| May 3, 1985 | [JP] | Japan | 60-043237 |
| May 3, 1985 | [JP] | Japan | 60-043238 |

[51] Int. Cl.[5] .................................................. G02F 1/13
[52] U.S. Cl. ............................... 350/348; 350/347 V;
350/335; 350/344; 350/350 S; 350/162.2
[58] Field of Search ............... 350/348, 337, 335, 336,
350/341, 346, 350 S, 400, 401, 403, 404, 162.11,
162.17, 162.2, 162.24, 344, 347 V, 347 R

[56] References Cited

U.S. PATENT DOCUMENTS

| 3,787,110 | 1/1974 | Berreman et al. | 350/341 |
|---|---|---|---|
| 3,791,716 | 2/1974 | Borel et al. | 350/347 V |
| 3,869,196 | 3/1975 | Kubota et al. | 350/337 |
| 4,228,574 | 10/1980 | Culley et al. | 350/337 |
| 4,243,300 | 1/1981 | Richards et al. | 350/150 |
| 4,251,137 | 2/1981 | Knop et al. | 350/348 |
| 4,362,359 | 12/1982 | Dammann et al. | 350/162.17 |
| 4,367,924 | 1/1983 | Clark et al. | 350/350 S |
| 4,536,059 | 8/1985 | Berk | 350/346 X |
| 4,674,840 | 6/1987 | Bennett | 350/336 |
| 4,729,640 | 3/1988 | Sakata | 350/348 |
| 4,822,146 | 4/1989 | Yamanobe et al. | 350/348 |
| 4,850,681 | 7/1989 | Yamanobe et al. | 350/348 |
| 4,850,682 | 7/1989 | Gerritsen | 350/348 |

FOREIGN PATENT DOCUMENTS

| 33341818 | 4/1982 | Fed. Rep. of Germany | 350/337 |
|---|---|---|---|
| 1345818 | 2/1974 | United Kingdom . | |
| 1395617 | 5/1975 | United Kingdom . | |
| 1396828 | 6/1975 | United Kingdom . | |
| 2016727 | 9/1979 | United Kingdom . | |
| 1383969 | 2/1985 | United Kingdom . | |

OTHER PUBLICATIONS

Zweig "Two Dimensional Laser Deflection using Fourier Optics", IBM Journal of Research and Development, Jul. '68, pp. 333–335.

Primary Examiner—Stanley D. Miller
Assistant Examiner—Tai V. Duong
Attorney, Agent, or Firm—Fitzpatrick, Cella, Harper & Scinto

[57] ABSTRACT

A functional optical element has at least one diffraction grating in which first and second elements are alternately arranged. At least one of the first and second elements comprises an optically anisotropic substance and the adjacent elements are substantially different from each other. This diffraction grating is so disposed that the arrayed surface of the diffraction grating is located in the path of the incident light beam. The functional optical device is characterized in that an incident light beam having an arbitrary polarization characteristic is functioned as a plurality of light beams which are polarized in the different directions, so that at least part of the incident light beam is subjected to the diffraction effect. The optical condition of at least one of the first and second elements may be varied by a control device.

4 Claims, 14 Drawing Sheets

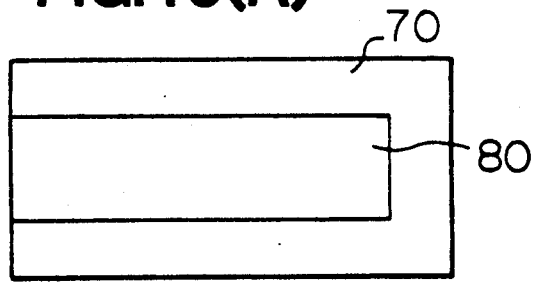
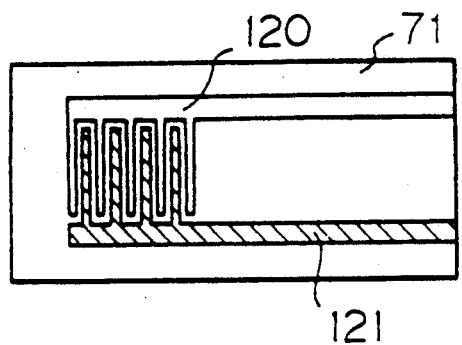
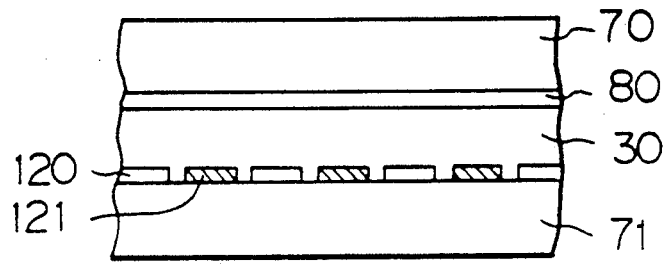
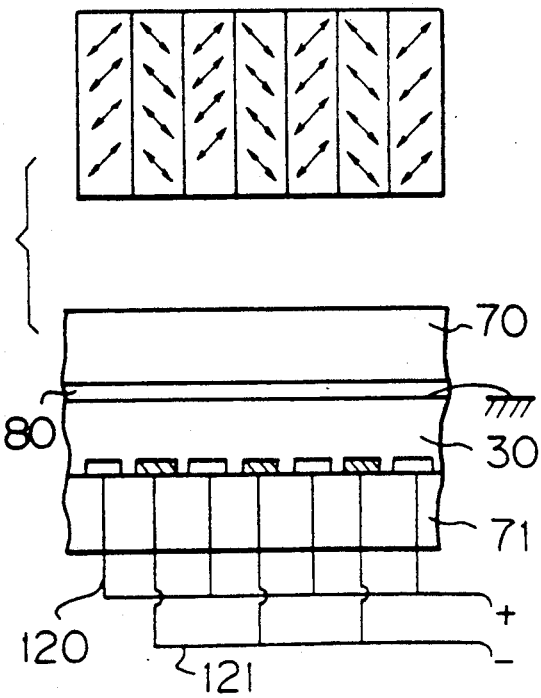
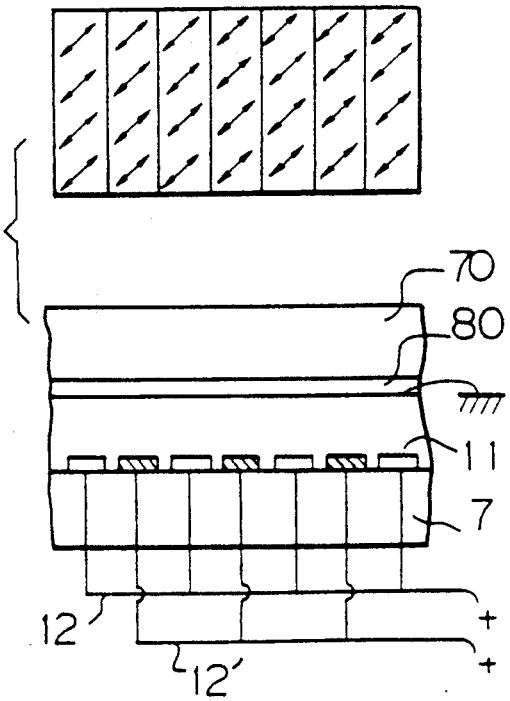

LIQUID CRYSTAL LIGHT MODULATION DEVICE

This application is a continuation of application Ser. No. 831,525 filed Feb. 20, 1986, now abandoned.

BACKGROUND OF THE INVENTION

1. Field of the Invention

The present invention relates not only to a functional optical element suitably adapted to be used in various devices for optical recording, optical coupling, optical communications, optical computation, optical display and so on but also a functional optical device comprises the optical elements of the type described above and more particularly an optical element and an optical device each having a diffraction grating which is not dependent upon the plane of polarization of a light beam used.

2. Related Background Art

So far various diffraction gratings have been used as functional optical elements in, for instance, spectroscopes, wave branching devices, wave synthesizing devices or reflectors. In addition, they are recently used in semiconductor lasers and optical integrated circuits and become very important optical elements.

Of the various diffraction gratings, a phase type diffraction grating has its surface roughened or varies the index of refraction in the medium in order to vary the phase. In general, the medium used in the diffraction grating of the type described above comprises an optically isotropic material and accomplishes its inherent function independently of the polarization of the light beam used. However, recently there has been an increasing tendency that the diffraction grating is made of an optically anisotropic material such as a crystal having an optic axis extended in a predetermined direction. In this case, the characteristic of the diffraction grating changes depending upon the direction of polarization of the light beam used. As a result, except that the case in which a light source is a laser and a plane polarized light beam is used, it is needed to polarize the light beam through a diffraction plate in a predetermined direction so that the optical efficiency is remarkably decreased in this step.

When the functional optical device utilizing the above-described optically anisotropic substance such as a liquid crystal, PLZT, BSO or other electro-optical crystals is used, the problems similar to those described above arise. In the device utilizing an electro-optical crystal, comb-shaped electrodes are disposed on the surface of a sliced electro-optical crystal in such a way that they cross each other, and a polarizer and a photosensor are disposed in front of and behind the electro-optical crystal. When an electric field is applied to the comb-shaped electrodes the index of double refraction of the crystal is varied, thereby controlling the light beam passing through the device comprising the polarizer, the electro-optical crystal and the photosensor. Such device as described above has a relatively high response characteristic and a high degree of contrast ratio in the case of a monochrome light beam, but has some defects that the driving voltage is considerably high ranging from 100 V to a few kV and it is difficult to attain a device having a large surface area.

In a device utilizing a liquid crystal, a liquid crystal is sandwiched between transparent electrodes disposed perpendicular to each other, and is oriented helically so that in the static state, the light beam passes through the mutually perpenducular electrodes, but when an electric field is applied, the liquid crystal is oriented in the direction of the applied electric field so that the light beam is interrupted by the polarizer disposed on the output side, whereby the transmission of the light beam through the device is cut off. The device utilizing such liquid crystal of the type described above can be driven at a relatively low driving voltage and the costs of the component parts are inexpensive. However, such device has a slow switching response speed and is instable in operation in response to the variation of temperature. In addition, its optical efficiency and contrast ratio are not satisfactory in practice.

As described above, the prior art functional optical devices have their own merits and demerits and a common problem similar to that encountered in the prior art functional optical elements. That is, these devices use as an incident light beam, a light beam having a specific polarization characteristic and in general a plane polarized light beam. As a result, in the case of the incident light which is polarized in random directions, polarizers must be used so that the optical efficiency is considerably reduced when the incident light beam passes through the polarizers.

SUMMARY OF THE INVENTION

In view of the above, one of the objects of the present invention is to provide a functional optical element and a functional optical device which can substantially overcome the above and other problems encountered in the prior art optical elements and devices and which has a high optical efficiency for a light beam having any arbitrary polarization characteristic even though optically anisotropic substances are used.

In order to attain the above and other objects of the present invention, a functional optical element in accordance with the present invention has at least one diffraction grating in which first and second elements are alternately arranged. The first and/or the second element comprises an optically anisotropic substance and the adjacent elements are substantially different from each other. Said at least one diffraction grating is so disposed that the arrayed or arranged surface of the diffraction grating is located in the path of the incident light beam. The functional optical device in accordance with the present invention is therefore characterized in that an incident light beam having an arbitrary polarization characteristic is split into a plurality of light beams which are polarized in different directions, respectively, so that at least part of the incident light beam is diffracted.

In another embodiment of the present invention, there is provided at least one diffraction grating in which first and second elements are alternately arranged and the first and/or second elements comprise an optically anisotropic substance whose optical conditions are variable. Said at least one diffraction grating is so disposed that the arrayed or arranged surface thereof is located in the path of the incident light beam. An incident light beam with an arbitrary polarization characteristic is split into a plurality of light beans which are polarized in different directions, respectively, so that at least part of the incident light beam is diffracted. Said another embodiment is characterized by having control means for varying the optical conditions.

The functional optical elements and devices having the above-described features are divided into three types and described in detail in this specification, and the present invention provides various novel elements.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 10(A), (B) and (C) are views used to explain the steps for fabricating the functional optical device as shown in FIG. 8(A);

FIGS. 11(A) and (B) are views used to explain the control method of the functional device as shown in FIG. 10;

DETAILED DESCRIPTION OF THE PREFERRED EMBODIMENTS

Figure 1A:
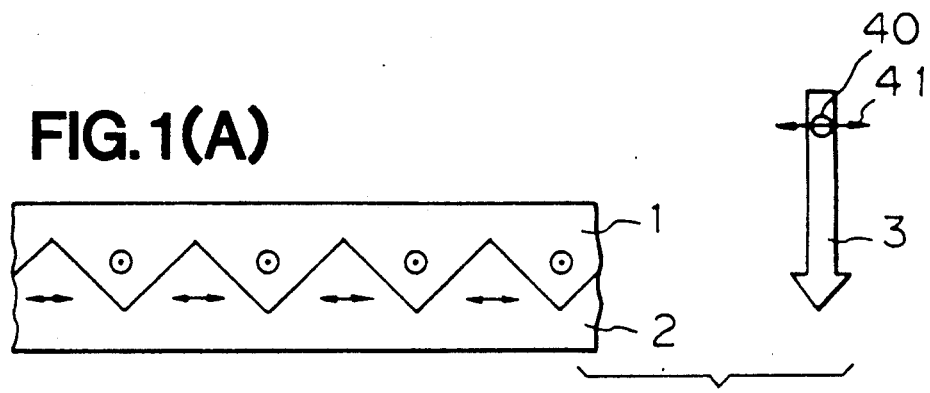
FIGS. 1(A), (B) and (C) are schematic views of the embodiments of the present invention.

FIGS. 1(A), (B) and (C) schematically illustrate the fundamental constructions of the functional optical elements in accordance with the present invention. Reference numerals 1 and 2 designate optically anisotropic substances whose optic axes are different; 3, an incident light beam; and 40 and 14, mutually perpendicular polarized components of the incident light beam 3. All of the functional optical elements as shown in FIG. 1 are transparent type functional optical elements. That is, the optically anisotropic substances 1 and 2 are transparent to the incident light beam 3. For the sake of better understanding, the optic axes and the direction of the polarized component of the incident beam are represented by the double-pointed arrows ←→ and the white circles with a dot at the center ⊙.

Figure 1B:
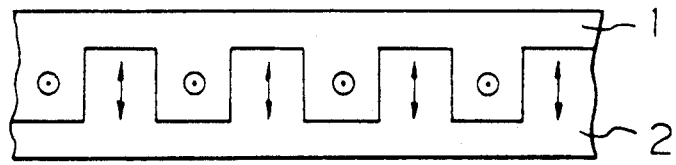
Figure 1C:
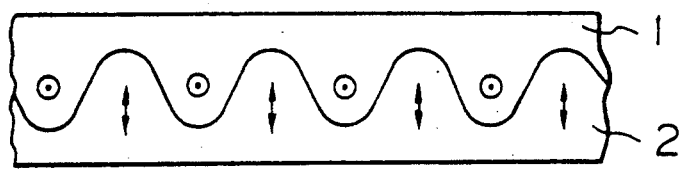

In the functional optical element as shown in FIG. 1(A), the optically anisotropic substances 1 and 2 have a sawtooth cross sectional configuration and each of the optic axes of the optically anisotropic substance 1 is extended in the direction of the grooves of the grating (that is, in the direction perpendicular to FIG. 1(A)) and each of the axes of the optically anisotropic substance 2 is extended in the direction of the arrangement (the right and left directions in FIG. 1(A)) of the grating. In the functional optical element as shown in FIG. 1(B), the optically anisotropic substances 1 and 2 have a rectangular cross sectional configuration and each of the optic axes of the optically anisotropic substance 1 is directed in the direction of the grooves of the grating while each of the optic axes of the optically anisotropic substance 2 is oriented perpendicular to the direction of the arrangement of the grating. The directions of the optic axes of the optically anisotropic substances 1 and 2 of the functional optical element as shown in FIG. 1(C) are similar to those of the optical element as shown in FIG. 1(B) and the grating defined by the optically anisotropic substances 1 and 2 is in the form of a sinusoidal waveform.

In the functional optical elements as shown in FIG. 1, the optic axes of the optically anisotropic substances 1 and 2 are perpendicular relative to each other in the space, but it is to be understood that it is not needed that they are perpendicular to each other. That is, it suffices that the optic axes of the optically anisotropic substance 1 intersect the optic axes of the optically anisotropic substance 2. However, in general, when the relative angular difference θ (when viewed from the incident light beam 3) between the two optic axes satisfy the condition $\theta \geq 30°$, the functional optical elements function satisfactorily in practice. In FIG. 1, the incident light beam 3 arrives vertically at the functional optical element, but it is to be understood that the functional optical elements of the present invention satisfactorily function for any light beams incident at any angles of incidence. The optically anisotropic substances 1 and 2 are, for instance, $LiNbO_3$, $LiTaO_3$, PLZT, $Cd_2(MoO_4)_3$, $Bi_4Ti_3O_{12}$, $Bi_{12}SiO_{12}$, GaAs, Si, ZnTe, $As_2Se_3$, Se, AsGeSeS, $BaTiO_3$, $TiO_2$, KDP, DKDP, ADP, ZnO, MnBi, $Ba_2NaNb_5O_{15}$, liquid crystals, $SiO_2$, CdS, $CaCO_3$, $ZrO_2$, $Al_2O_3$, $MgF_2$ and so on. According to the present invention, the two optically anisotropic substances 1 and 2 which define a grating may be the same or different substances. That is, in the case of the fabrication of the functional optical elements in accordance with the present invention, it suffices that the directions of the optic axes of the substances which define a grating may be selected arbitrarily, and whether the same or different substances are used is dependent upon not only the required function of the functional optical elements but also the easiness with which the functional optical elements are fabricated.

In general, the directions of the optic axes of the two substances disposed alternately are different depending upon the substances used, the limitations imposed upon the fabrication of the functional optical elements, the specifications thereof and other conditions so that various modifications of the functional optical elements in accordance with the present invention may be provided.

When the functional optical elements in accordance with the present invention are used, not only the light beam can be branched and polarized but also it becomes possible to obtain a plane polarized light beam polarized in a predetermined direction from the light beam having an arbitrary polarization characteristic or to split the light beam having an arbitrary polarization characteristic into two plane polarized light beams polarized in different directions. When the configuration of a grating is varied or when a functional optical element is made in the form of a disk, the functional optical element can focus an image of an object. The reason why the functional optical elements in accordance with the present invention have such various functions resides in the fact that a diffraction grating is formed by two substances whose directions of the optic axes are different and which are arranged alternately so that the indexes of refraction of the two substances are made different from each other in response to the polarized component of the light beam used. Thus, according to the present invention, the optically anisotropic substances are positively used in the fabrication of the diffraction gratings.

Next the mode of operation of the functional optical element in accordance with the present invention will be described with reference to FIGS. 2(A) and (B). Same reference numerals are used to designate similar parts in FIGS. 1 and 2. Reference numerals 50 and 51 designate high-order diffracted light beams; and 6, the zero-order light beam. The functional optical element defines a phase type diffraction grating which is substantially transparent to an incident light beam.

Figure 2A:
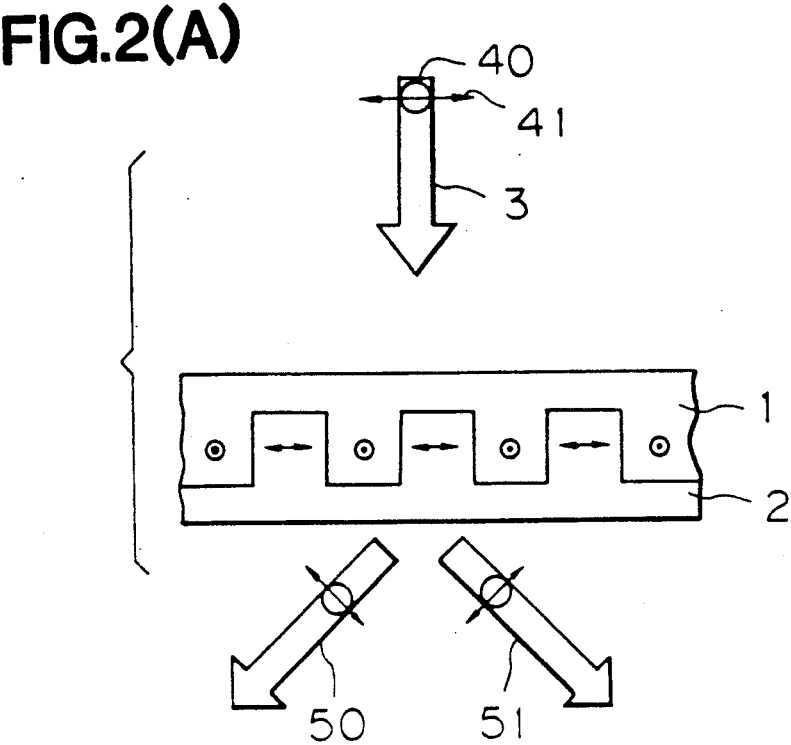
FIG. 2(A) and (B) are views used to explain the mode of operation of the functional optical element as shown in FIG. 1(B)

In the element as shown in FIG. 2(A), the optically anisotropic substances 1 and 2 define a rectangular diffraction grating and the optic axes of the optically anisotropic substance 1 are extended in the direction of the grooves of the diffraction grating (that is, in the direction perpendicular to FIG. 2(A)) while the optic axes of the optically anisotropic substance 2 are oriented in the direction of the arrangement of the diffraction grating (that is, in the horizontal direction in FIG. 2(A)) so that the optic axes of the optically anisotropic substances 1 and 2 are perpendicular to each other.

Figure 2B:
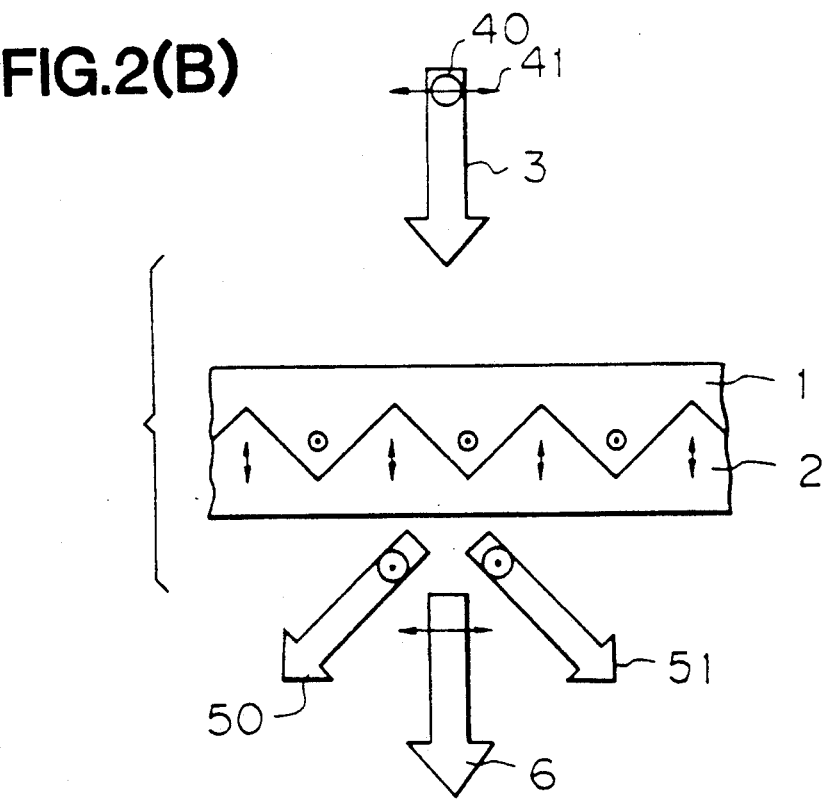

In general, as shown in FIG. 1, a light beam polarized in a random direction or a light beam having an arbitrary polarization characteristic can be resolved into two mutually perpendicular components 40 and 41. In the case of the functional optical element as shown in FIG. 2(A), the polarized component 40 of the incident light beam 3 is in parallel with the optic axes of the optically anisotropic substance 1 so that it encounters the index of refraction Ne of the optically anisotropic substance 1. Furthermore, the polarized component 40 is perpendicular to the optic axes of the optically anisotropic substance 2 and encounters the index of refration N'o of the optically anisotropic substance 2. The polarized component 41 of the incident light beam 3 encounters the normal index of refraction No of the optically anisotropic substance 1 and an extraordinary index of refraction of the optically anisotropic substance 2. Therefore it may be considered that the mutually perpendicular polarized components 40 and 41 of the incident light beam 3 independently pass through the phase type diffraction gratings formed by the substances having the indexes of refraction Ne and N'o; and No and Ne. Now assume that the difference in index of refraction $\Delta n$ between the optically anisotropic substances 1 and 2 which define the grating to the two polarized components 40 and 41 is expressed as follows:

$\Delta n = |n_e - n'_o|$ for the polarized component 40 and
$\Delta n' = n_o - n'_e$ Then, when the condition that $\Delta n = \Delta n'$ is satisfied, even though the diffraction grating of the functional optical element of the present invention is defined by the optically anisotropic substances, it diffracts the two polarized components as if it were made of an isotropic substance. As a result, the functional optical element in accordance with the present invention effectively functions when a light beam having an arbitrary polarization characteristic arrives at it. For instance, the functional optical element of the present invention has not only the function of splitting a light beam but also the function of a polarizer as shown in FIG. 2(B) as will be described in detail below.

Next the method for fabricating the functional optical element as shown in FIG. 2(A) as well as the result of the evaluation of its performance will be described. A $TiO_2$ crystal is sliced along its crystallographic axis to obtain $50 \times 50 \times 1$ (mm) plates. Therefore both the major surfaces of the plates are polished and cleaned, whereby two transparent substrates are prepared. RD-2000N (the negative resist, the product of Hitachi Seisakusho KK.) is spinner coated over the surfaces of the two transparent substrates and thereafter the two transparent substrates are subjected to a predetermined prebaking process. Thereafter, they are masked, exposed and developed so that a grating 4000Å in thickness with a pitch of 1.6 μm which consists of the regist is obtained. It should be noted that the direction of the arrangement of the diffraction gratings of the substrates is such that one is oriented in the direction of the crystallographic axis while the other is perpendicular thereto. That is, the directions of the crystallographic axes are perpendicular to each other. Next the major surfaces of the substrates are etched to the depth of 1.54 μm by an ion etching process using a gas mixture of $CF_4$-$O_2$ and the resist is removed by a resist remover, whereby two substrates having diffraction gratings consisting of $TiO_2$ are provided. The gratings of the two substrates engage with each other so that the functional optical element as shown in FIG. 2(A) is provided. For the light beam having a wavelength of 8300Å, the normal index of refraction No of $TiO_2$ is 2.51 and the extraordinary index of refraction Ne is 2.78. Therefore, the above-described difference in index of refraction $\Delta n$ or $\Delta n'$ becomes 0.27.

In the phase type diffraction grating of the functional optical element in accordance with the present invention fabricated by the process described above, the order at which the transmitted and diffracted light beam exists is given by the following equation:

$$\frac{2\pi}{\lambda_0} \geq |m| \frac{2\pi}{\Lambda} \quad (m = 0, \pm 1, \pm 2, \ldots)$$

where $\lambda_0$ is the wavelength of the incident light beam; $\Lambda$ is the pitch of the diffraction grating; and m is the order of the transmitted and diffracted light beam. In the case of the evaluation of the performance of the functional optical element in accordance with the present invention, the incident light beam ($\lambda_0 = 8300$Å) is polarized at random. Substituting $\lambda_0 = 8300$Å and $\Lambda = 1.6$ μm into the above equation, we find that the order m at which the diffracted light beam can exist becomes $-1, 0$ and 1. Meanwhile, the zero number diffraction efficiency $\eta_0$ of the rectangular diffraction grating of the functional optical element in accordance with the present invention is expressed by $$\eta_0 = 1/2 \left[ 1 - \cos\left(2\pi \frac{\Delta n \cdot T}{\lambda_0}\right) \right] \quad (1)$$

where T is the height of the diffraction grating. When the following condition is satisfied $$\Delta n \cdot T = (\tfrac{1}{2} + m)\lambda_0 \, (m=0,1,2,3,\ldots) \quad (2)$$

$\eta_0 = 0$ so that the zero-order transmitted and diffracted light beam does not exit. It follows therefore that the diffracted light beams which satisfy Eq. (2) are $\pm$ first-order light beams 5 and 5' as shown. Since the shapes of the gratings are symmetrical, the energy assigned to the + first-order diffracted light beam 5 is equal to that assigned to the − first-order diffracted light. As a result, the total optical efficiency is higher than 80% and the S/N ratio is higher than 100:1.

When the functional optical element is operated based upon the above-described principle, it may be used as a so-called subtractive filter. That is, as is apparent from Eq. (1), for an arbitrary wavelength $\lambda_0$, the functional optical element in accordance with the present invention has a predetermined function regarding to the zero-order diffracted light. Therefore, when white light is used as an incident light and an arbitrary wavelength $\lambda_0$ (which, for instance, corresponds to red, green or blue) is emitted all as a high-order diffracted light beam based on Eq. (2), the zero-order transmitted and diffracted light beam having a predetermined spectral characteristic (for instance, cyan, mazenta or yellow) can be derived. In this case, it is of course Eq. (1) "$\Delta n \cdot T$" that determines the color of the zero-order transmitted and diffracted light beam for the incident light beam having a predetermined spectral.

The functional optical element as shown in FIG. 2(B) has a function similar to that of a polarizer or a polarized light beam splitter. Reference numeral 6 designates the zero-order transmitted light beam. The optic axes of the optically anisotropic substance 1 are extended in the direction of the grooves while the optic axes of the optically anisotropic substance 2 are oriented in the direction perpendicular to the grating arrangement surface and the optix axes of the optically anisotropic substances 1 and 2 are perpendicular to each other. In the functional optical element in accordance with the present invention, the optically anisotropic substances 1 and 2 define a sawtooth-like grating. In this functional optical element, the optically anisotropic substances 1 and 2 are same. (This means that $n_o = n'_o$ and $n_e = n'_e$.) When the incident light 3 having an arbitrary polarization characteristic arrives at the functional optical element, the polarized component 40 of the incident light beam 3 encounters the extraordinary index of refraction $n_e$ of the optically anisotropic substance 1 while the polarized component 41 encounters the normal index of refraction of the optically anisotropic substance 1 and the normal index of refraction $n'_o$ of the optically anisotropic substance 2. As a result, for the polarized component 40 of the incident light beam, there exists a diffraction grating having the indexes of refraction $n_e$ and $n'_o$ while for the polarized component 41, there exists a diffraction grating having the indexes of refraction $n_o$ and $n'_o$. However, as described above, $n_o = n'_o$ and $ne = n'_e$ so that there does not exist any diffraction grating for the polarized component 41. As a result, the polarized component 41 passes through the functional optical element and becomes the zero-order transmitted light beam 6. On the other hand, the polarized component is diffracted by a diffraction grating with $\Delta n = |n_e - n_o|$. In this case, if the equation (3) of the diffraction efficiency of the zero-order transmitted and diffracted light through the sawtooth-like diffraction grating to be described below is such that $\eta_0 = 0$, the polarized component 40 becomes the high-order diffracted light beams 50 and 51. In this manner, a predetermined plane polarized light beam can be obtained from a light beam having random polarization directions.

$$\eta_0 = \sin c \left( \pi \frac{\Delta n \cdot T}{\lambda_0} \right) \quad (3)$$

When a plane polarized light is obtained through a conventional polarizer, the light loss rises as high as 70%, but when the functional optical element in accordance with the present invention is used, the light loss becomes of the order of 50%.

Only one example of various optical functions of the functional optical element in accordance with the present invention has been described so far with reference to FIG. 2. The functional optical element of the present invention can accomplish various functions when the configurations of the gratings defined by the optically anisotropic substances 1 and 2, the pitches of the gratings, the heights thereof, the difference in index of refraction between the optically anisotropic substances, the directions of the optic axes thereof and so on are varied. It is of course possible to use as the functional optical element of the present invention a Fresnel lens, a curved grating or a grating coupler and in a DFB laser. The shapes of the gratings are not limited to the symmetrical shapes and may be asymmetrical.

Figure 3A:
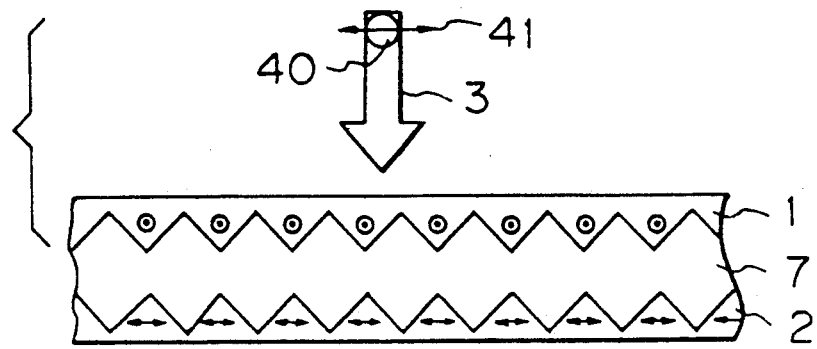
FIGS. 3(A), (B) and (C) are schematic views illustrating variations of the functional optical element in accordance with the present invention.

FIGS. 3(A), (B) and (C) are schematic views illustrating the modifications of the functional optical element in accordance with the present invention. As in the case of FIG. 1, the reference numerals 1 and 2 designate optically anisotropic substances whose optic axes are extended in different directions, respectively; 3, an incident light beam; 40 and 41, mutually perpendicular polarized components of the incident light beam 3; and 7, an optically isotropic substance such as an transparent optical element, air or the like. In the modifications as shown in FIG. 3, two-layer diffraction gratings are defined in such a way that the optic axes of the optically anisotropic substances 1 and 2 are perpendicular to each other in the grating arrangement surface.

The functional optical elements shown in FIG. 3 are fabricated from the substances which are transparent to the incident light beam 3 as in the case of the embodiments described above with reference to FIGS. 1 and 2, and each diffraction grating is of the phase type.

Figure 3B:
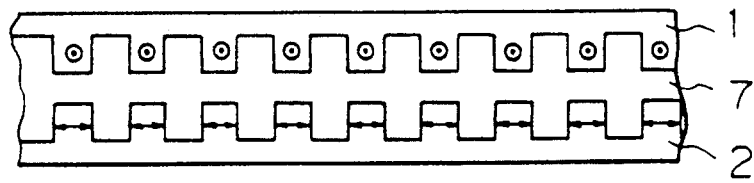
Figure 3C:
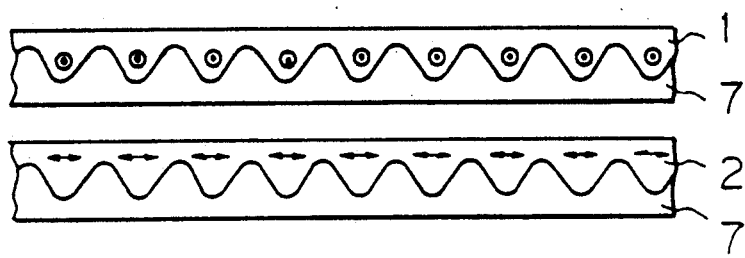

In the functional optical element as shown in FIG. 3(A), the interfaces between the transparent optical element 7 on the one hand and the optically anisotropic substances 1 and 2 on the other hand define sawtooth-like gratings. The optic axes of the optically anisotropic substance are extended in the direction of the grooves of the grating (that is, in the direction perpendicular to FIG. 3(A)) while the optic axes of the optically anisotropic substance 2 are extended in the direction of the arrangement of the grating (in the horizontal direction in FIG. 3(A)). In the functional optical element as shown in FIG. 3(B), the interfaces between the transparent element 7 on the one hand and the optically anisotropic substances 1 and 2 on the other hand define rectangular-wave-like gratings. The directions of the optic axes of the optically anisotropic substances are the same as those described above with reference to FIG. 3(A). In the functional optical elements as shown in FIGS. 3(A) and (B), two gratings are defined through the transparent optical element 7 within the functional optical element. However, in the case of a functional optical element as shown in FIG. 3(C), the optically anisotropic substances 1 and 2 and transparent optical elements 7 constitute independent elements which are disposed one upon the other. Therefore, the element as shown in FIG. 3(C) is a double element. The relationship between the directions of the optic axes of the optically anisotropic substances 1 and 2 are same as the relationship described with reference to FIG. 3(A). The gratings are in the form of a sinusoidal waveform. In FIG. 3, a plurality of diffraction gratings are superposed one upon the other in the direction of the incident light beam. The diffraction gratings which constitute a functional optical element may be in the form of a sawtooth waveform, a rectangular waveform, a sinusoidal waveform or may be asymmetric. It suffices that the directions of the optic axes of the substances of a plurality of gratings are different when viewed from the incident light beam and it is not needed that the optic axes of the optically anisotropic substances 1 and 2 be perpendicular to each other in the modifications as shown in FIG. 3. In these embodiments, each functional optical element comprises two gratings, but it is to be understood that a functional optical element comprises more than two gratings. In the embodiments as shown in FIG. 3, the grooves of each grating are parallel, but it is to be understood that they may be extended in different directions, respectively. Furthermore, as long as the function of the functional optical element is ensured, the surfaces of the grating may be inclined. Of course, the functional optical elements as shown in FIG. 3 function satisfactorily regardless of the angle of incident of the incident light beam 3.

Figure 4:
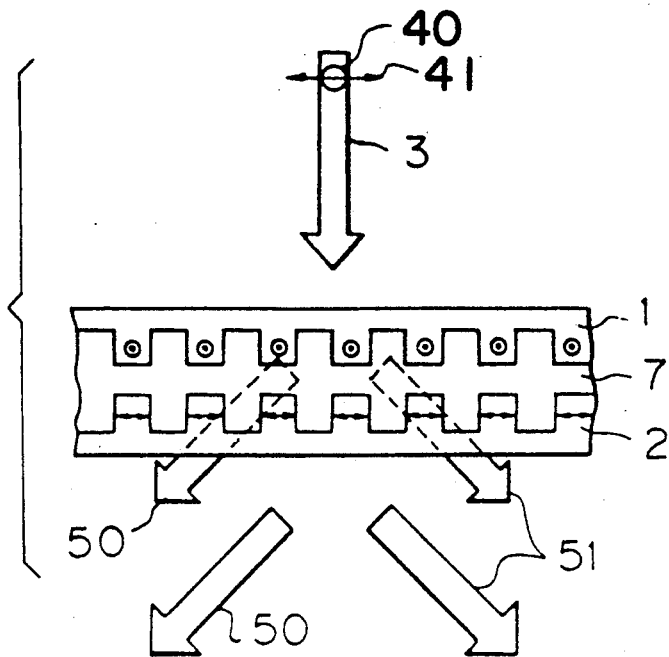
FIG. 4 is a view used to explain the mode of operation of the functional optical element as shown in FIG. 3(B)

Referring next to FIG. 4, the mode of operation of the functional optical element as shown in FIG. 3(B) will be described. Same reference numerals are used to designate similar parts in FIGS. 2, 3 and 4. The polarized component of the incident beam 3 is in parallel with the direction of the optical axes of the optically anisotropic substance 1 and encounters the extraordinary index of refraction $n_e$ thereof. The polarized component 41 of the incident light beam 3 is perpendicular to the direction of the optic axes of the optically anisotropic substance 1 and encounters the normal index of refraction $n_o$ thereof. The polarized component 40 of the incident light beam 3 encounters the normal index of refraction $n'_o$ of the optically anisotropic substance 2 while the polarized component 41 encounters the extraordinary index of refraction $n'_e$ thereof. Since the transparent optical element 7 is optically isotropic, it has a predetermined constant index of refraction $n_g$ regardless of the polarized components of the incident light beam 3.

Therefore, at the first diffraction grating from the direction of the incident light beam, the polarized component 40 of the incident light beam 3 encounters the diffraction grating having the indexes of refraction $n_e$ and $n_g$ while the polarized component 41 encounters the grating having the indexes of refraction $n_o$ and $n_g$. At the second diffraction grating, the polarized component 40 encounters the diffraction grating having the indexes of refraction $n'_o$ and $n_g$ while the polarized component 41 encounters the diffraction grating having the indexes of refraction $n'_e$ and $n_g$. If the conditions that $n_o = n'_o = n_g$ and $n_e = n'_e$ are previously set (that is, if the optically anisotropic substances are same), at the first stage, the polarized component 40 to the incident beam 3 is diffracted under predetermined conditions while the polarized component 41 is not diffracted and passes through the first stage. At the second stage, the zero-order light 50 and the high order light 51 of the polarized component 40 pass through the second stage and are not influenced while the polarized component 41 is diffracted under predetermined conditions so that the zero-order light 50 and the high order light are derived. That is, when the above-described predetermined condition is that the diffraction efficiency of the zero-order diffracted light is zero, the light beam having an arbitrary polarization characteristics is emitted from the functional optical element as the high order diffracted light rays 50 and 51 as shown in FIG. 4.

Next the method for fabricating the functional optical element and the valuation of the performance of the functional optical element as shown in FIG. 4 will be described.

A $CaCO_3$ crystal is sliced along the crystallographic axis thereof into plates each of which is $50 \times 50 \times 1$ ($mm^3$) in size and the surface of the plates are polished and cleaned, whereby two substrates are prepared. RD-2000N (the negative resist, the product of Hitachi Seisakusho KK.) is spinner coated over the major surfaces of the two substrates and then the substrates are subjected to a predetermined prebaking process. Thereafter the substrates are masked, exposed and developed so that the regist gratings 4000Å in thickness with a pitch of 1.6 μm are formed. The grating on one of the substrates is in the direction of the crystallographic axis while the grating on the other substrate is perpendicular to the crystallographic axis. Thereafter the substrates are etched to the depth of 1.54 μm by a reactive ion etching process using a mixture gas of CF and $O_2$ and the regist is removed by a regist remover. Thus, two $CaCO_3$ substrates having mutually perpendicular optic axes are provided.

The two substrates thus fabricated are disposed in opposed relationship in such a way that the major surfaces upon which are formed the gratings oppose each other and a thermosetting resin with an index of refraction $n_g = 1.48$ is sandwiched as a transparent optical element between the substrates. Thereafter the assembled substrates and the optically transparent element are heated for one hour at 90° C., whereby the functional optical element as shown in FIG. 4 is provided. For the light having the wavelength of 8300Å the normal index of refraction $n_o$ of $CaCO_3$ is 1.64 and the extraordinary index of refraction $n_e$ thereof is 1.48. Therefore the difference in index of refraction $\Delta n$ is 0.16.

Meanwhile, in the case of the diffraction gratings constituting the functional optical element of the present invention, the orders of the transmitted and diffracted light can be expressed by the following equation:

$$\frac{2\pi}{\lambda_0} \geq |m| \frac{2\pi}{\Lambda} \quad (m = 0, \pm 1, \pm 2, \ldots)$$

where $\lambda_0$ is the wavelength of the incident light beam; $\Lambda$ is the pitch of the diffraction grating; and m is the order of the transmitted and diffracted light. In order to evaluate the performance of the functional optical element in accordance with the present invention, light ($\lambda_0 = 8300$Å) which is polarized in randam directions is used. When various conditions are substituted into the above-described equation, it is seen that the orders of the diffracted light at both the first and second stage diffraction gratings are $-1$, 0 and 1.

When the incident light beam ($\lambda_0 = 8300$Å) which is polarized in random directions is incident on the functional optical element perpendicular to the major surface thereof, the polarized component 40 satisfies the above-described equation (2) at the first stage diffraction grating and becomes the $\pm 1$ order diffracted light 50 and 51 and passes through the second stage diffraction grating without being influenced. On the other hand, the polarized component 41 passes through the first stage diffraction grating without being influenced and satisfies the above-described condition (2) at the second stage diffraction grating and becomes the $\pm 1$ order light 50 and 51. Therefore, no light in the direction of the zero-order appears and all the incident light beam 3 becomes the $\pm$ first-order diffracted light. Furthermore, since the shapes of the gratings are symmetrical, the energy is distributed uniformly to the plus first order diffracted light and the minus first order diffracted light so that the overall optical efficiency is higher than 80% and the S/N ratio is also higher than 100:1.

Figure 5A:
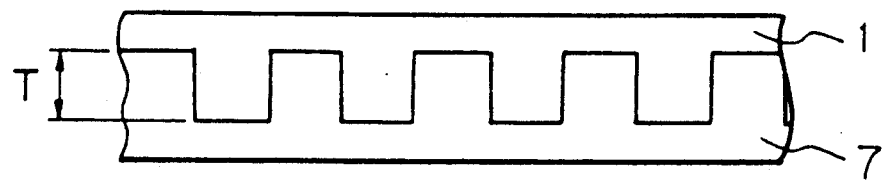
FIGS. 5(A), (B) and (C) are schematic views illustrating further variations of the functional optical element in accordance with the present invention.

FIGS. 5(A), (B) and (C) are schematic views illustrating the modifications, respectively, of the functional optical element in accordance with the present invention. As in the cases of the preferred embodiments described above, reference numeral 1 designates an optically anisotropic substance; 7, an optically isotropic substance; and T, the thickness of the grating.

In the case of the functional optical element as shown in FIG. 5(A), the optically anisotropic substance 1 and the optically isotropic substance 7 form a grating having a rectangular waveform. When the wavelength of the incident light beam having an arbitrary polarization characteristic is $\lambda_0$; the indexes of refraction of the optically anisotropic substance 1 for mutually perpendicular polarized components of the incident light are $n_1$ and $n_2$, respectively; and the index of refraction of the optically isotropic substance 7 is $n_g$, the following conditions are satisfied in the functional optical element:

$$|n_1 - n_g| \cdot T \cong (\tfrac{1}{2} + l_1)\lambda_0 (l_1 = 0, 1, 2, 3, \ldots) \text{ and} \quad (4)$$

$$|n_2 - n_g| \cdot T \cong (\tfrac{1}{2} + l_2)\lambda_0 (l_2 = 0, 1, 2, 3 \ldots) \quad (5)$$

Figure 5B:
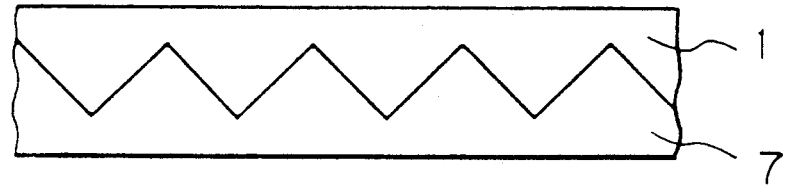

In the case of the functional optical element as shown in FIG. 5(B), the optically anisotropic substance 1 and the optically isotropic substance 7 form a grating having a sawtooth waveform and the following conditions are satisfied $$|n_1 - n_g| \cdot T \cong m_1 \lambda_1 (m_1 = 1, 2, \ldots) \quad (6)$$

and $$|n_2 - n_g| \cdot T \cong m_2 \lambda_2 (m_2 = 1, 2, \ldots) \quad (7)$$

Figure 5C:
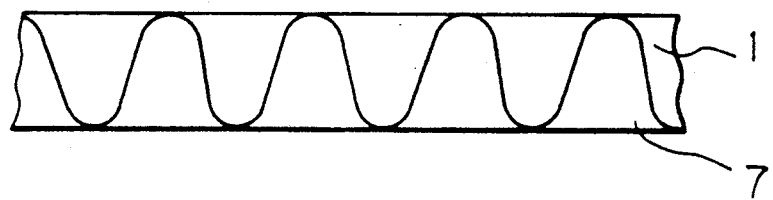

In the case of the functional optical element as shown in FIG. 5(C), the optically anisotropic substance 1 and the optically isotropic substance 7 form a grating having a sinusoidal waveform and the following conditions are satisfied $$n_1 - n_g \cdot T \cong \lambda_0 (k_1 - 1/4 - 0.050661/4k_1 - 1 - \quad (8)$$
$$0.053041/(4k_1 - 1)^3 - 0.262051 \cdot (4k_1 - 1)^5 \ldots)$$
$$(k_1 = 1, 2, 3, \ldots)$$

and $$n_2 - n_g \cdot T \cong \lambda_0 (k_2 - 1/4 - 0.050661/4k_2 - 1 - \quad (9)$$
$$0.053041/(4k_2 - 1)^3 - 0.262051/(4k_2 - 1)^5 \ldots)$$
$$(k_2 = 1, 2, 3, \ldots)$$

When the light beam having an arbitrary polarization characteristic is incident to each of the functional optical elements as shown in FIGS. 5(A), (B) and (C), the zero-order transmitted and diffracted light is not emitted as far as the above-described conditions are satisfied even though the functional optical elements comprise an optically anisotropic substance. In other words, the incident light beam does not pass through the functional optical element and becomes the high order light.

Figure 6:
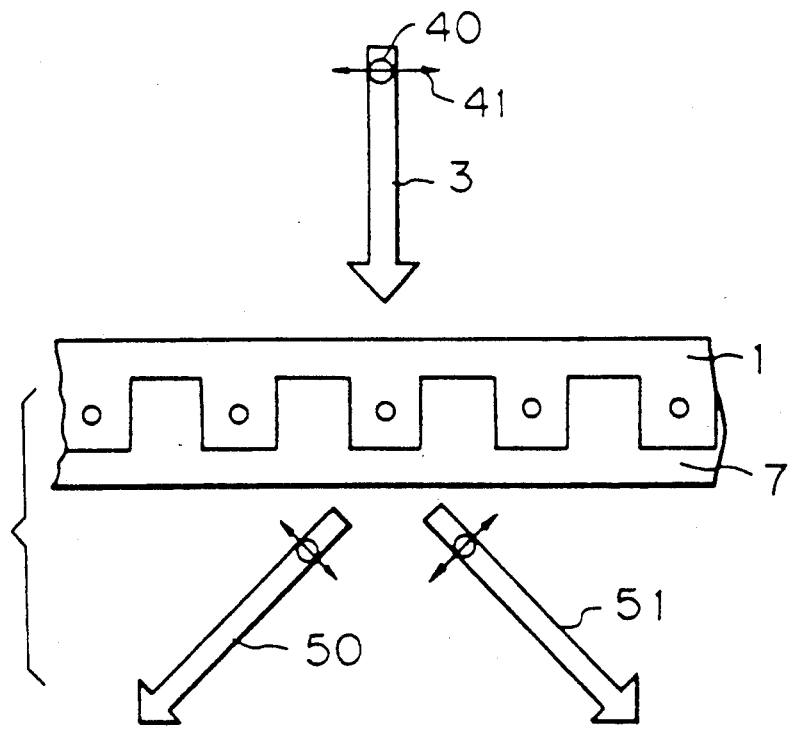
FIG. 6 is a view used to explain the mode of operation of the functional optical element as shown in FIG. 5(A)

Referring next to FIG. 6, the diffraction principle of the functional optical elements in accordance with the present invention will be described. Reference numeral 1 designates an optically anisotropic substance; 7, an optically isotropic substance having an index of refraction $n_g$; 3, an incident light beam having an arbitrary polarization characteristic; 40, and 41, mutually perpendicular polarized components of the incident light beam 3; and 50 and 51, the high order diffracted light. A symbol O designates to direction of the grooves of the grating (perpendicular to FIG. 6) while a symbol or double-pointed arrow ⟵⟶ represents the direction of the arrangement of the grating (in the horizontal direction in FIG. 6).

The functional optical element having a rectangular-waveform-like grating as shown in FIG. 5(A) is used to explain the underlying principle of the present invention. It should be noted that the direction of the optic axes of the optically anisotropic substance 1 is in parallel with the direction of the grooves of the grating. In practice, however, the optic axes may be extended in any direction except the direction of the incident light beam.

When the light beam 3 is incident to the functional optical element, of the mutually perpendicular polarized components 40 and 41 of the incident light beam 3, the polarized component 40 is in parallel with the direction of the optic axes of the optically anisotropic substance 1 so that it encounters the extraordinary index of refraction $n_e$ thereof. On the other hand, the polarized component 41 is perpendicular to the optix axes of the optically anisotropic substance 1 so that it encounters the normal index of refraction $n_o$ thereof. As a result, the polarized component 40 encounters (feels) the grating having the indexes of refraction $n_e$ and $n_g$ while the polarized component 41 encounters the grating having the indexes of refraction $n_o$ and $n_g$. The diffraction gratings shown in FIG. 6 is in the form of a rectangular waveform so that the diffraction efficiency $\eta_0$ can be obtained for the zero-order transmitted and diffracted light from the above-described Eq. (1). The condition for emitting only the high order diffracted light is expressed in the above-described equation (2). Therefore, when the conditions (4) and (5) are satisfied for the polarized components 40 and 41 of the incident light beam 3, $\eta_0=0$ so that no zero-order transmitted and diffracted light is emitted. The selection and arrangement of the optically anisotropic substance 1 and the optically isotropic substance 7 of the functional optical element of the present invention are determined on the assumption that $n_1=n_e$ and $n_2=n_o$ in Eqs. (4) and (5). It is apparent from the above-described embodiments that the gratings may have any suitable configuration.

Various materials described in conjunction with the first embodiment of the present invention may be used as an optically anisotropic substance 1. An optically isotropic substance suitable for use in the functional optical elements of the present invention is, for instance, glass, $SiO_2$, MgO, KCl, NaCl, KBr, $SrTiO_3$, PMMA (polymethyl methacrylate), polystyrene, polycarbonate, PVK (polyvinyl carbazole), an epoxy resin or a photo resit.

Next the method for fabricating the functional optical element as shown in FIG. 6 and the evaluation of the performance thereof will be described in detail below.

A $CaCO_3$ crystal is sliced along the crystallographic axis thereof into plates $50 \times 50 \times 1$ mm$^3$ in size and after polishing both the major surfaces thereof and cleaning, transparent substrates are provided. Next RD-2000N (the negative regist, the product of Hitachi Seisakusho KK.) is spinner coated over the major surfaces of the substrates and then the substrates are prebaked under predetermined conditions. After masking, exposure and development, a regist grating 4000Å in thickness and with a pitch of 1.6 μm is formed. It should be noted that the direction of the grating is in parallel with the crystallographic axis. Thereafter the major surface of the substrate is etched to the depth of 5.19 μm by a reactive ion etching process using a mixture gas of $CF_4$ and $O_2$. Next the regist is removed by a regist remover, whereby transparent substrates each having a rectangular-waveform-like grating are provided.

Epotec 301-2 (two-liquid epoxy resin, the product of Epotec Corp.) is spin coated over the surface of the grating and cured or hardened by heating it at 80° C. for 1.5 hours, thereby forming a flat surface which fills the grooves of the grating. For the wavelength of 8300Å, the normal index of refraction $n_o$ of $CaCO_3$ is 1.64 and the extraordinary index of refraction $n_e$ is 1.48. The index of refraction of an epoxy resin is 1.56.

In the case of the diffraction grating constituting the functional optical element of the present invention, the orders in which the transmitted and diffracted light exists are $-1$, 0 and $+1$. When the light 3 having an arbitrary polarization characteristic ($\lambda_0=8300$Å) is incident to the functional optical element perpendicular to the major surface thereof, the polarized component 40 which is polarized in the direction in parallel with the grooves or slits of the grating encounters a rectangular-waveform-like grating comprising a $CaCO_3$ crystal with the index of refraction $n_e$ ($=1.64$) and an epoxy resin with the index of refraction $n_g$ ($=1.56$). In this case, the polarized components 40 and 41 satisfy the above-described conditions (4) and (5) so that in Eq. (1) $\eta_0 \cong 0$.

As a result, no light is emitted in the direction of zero-order and all the incident light beam 3 becomes the $\pm$ first order diffracted light 50 and 51. In addition, since the shapes of the gratings are symmetrical, the energy is uniformly distributed to the plus first order diffracted light 50 and the minus first order diffracted light 51 so that the overall optical efficiency is higher than 80% and the S/N ratio is also higher than 100:1.

All the functional optical elements described above with reference to FIGS. 1-6 are of the transmission type, but it is to be understood that the functional optical elements in accordance with the present invention may be of the reflection type. In the latter case, the light reflecting materials are used as predetermined component parts or light reflecting films are formed on predetermined surfaces.

Next the shapes of the gratings will be discussed in detail hereinafter. As compared with a rectangular-waveform-like grating, the spectral transmission factor characteristic curve of a sawtooth-waveform-like grating becomes more flat and as compared with a sawtooth-waveform-like grating, the spectral transmission factor characteristic curve of a sinusoidal-waveform-like grating becomes more flat. Therefore when an incident light beam has a predetermined spectral, it is preferable to use a sawtooth-waveform-like grating or a sinusoidal-waveform-like grating in order to suppress the dispersion of the diffracted light. When a functional optical element of the present invention is used as a substractive color filter as described elsewhere, it is preferable to use a rectangular-waveform-like diffraction grating which is designed in a simple manner. It is apparent that from the standpoint of fabrication, the rectangular-waveform-like gratings are simple in shape.

A typical example of a diffraction grating which is asymmetric in shape is a blazed grating which is in the form of an asymmetrical triangular form. With a blazed grating, it becomes possible to concentrate the energy of an incident light beam on a predetermined order, for instance, on the diffracted light in the third order. Another asymmetrical diffraction grating is the so-called echelette grating consisting of a plurality of plane-parallel plates stacked together with a constant offset.

As described above, the functional optical elements in accordance with the present invention can be used in various types of gratings and can have various functions depending on their uses. It is apparent that the features and applications of the functional optical elements described above are also applicable to the functional optical devices to be described below.

Figure 7:
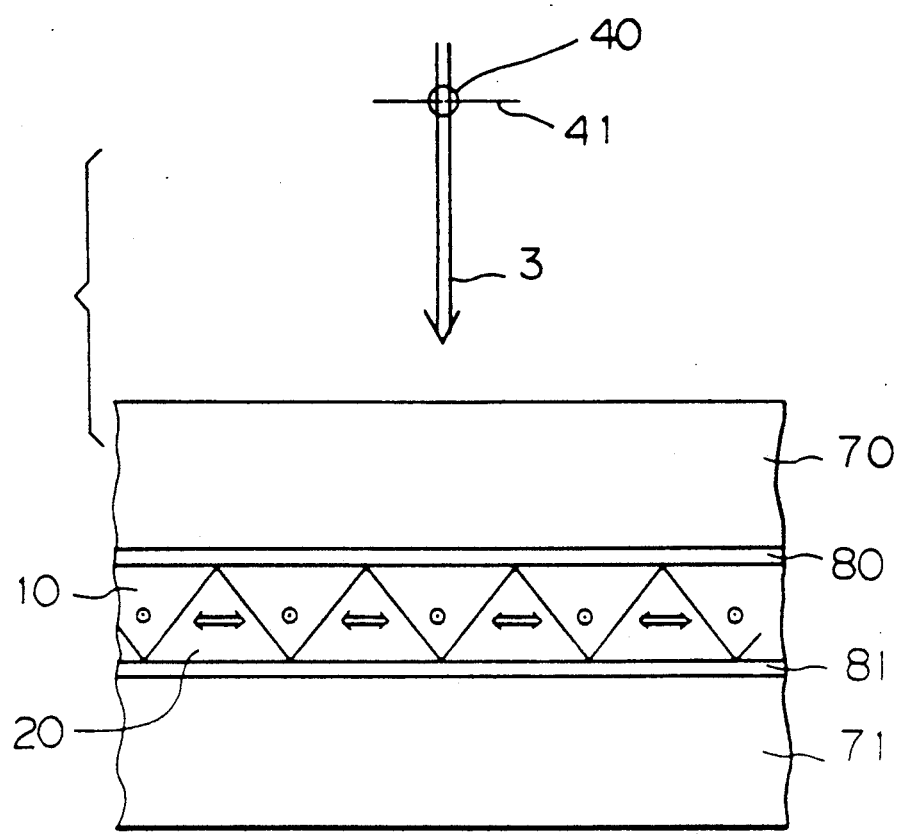
FIG. 7 is a schematic sectional view of a functional optical device in accordance with the present invention whose fundamental construction is substantially similar to that of the functional optical element as shown in FIG. 1(A)

FIG. 7 is a schematic sectional view of a preferred embodiment of a functional optical device in accordance with the present invention whose fundamental construction is substantially similar to that of the functional optical element described above with reference to FIG. 1(A). Same reference numerals are used to designate similar parts in FIGS. 1 and 7. Instead of the optically anisotropic substances 1 and 2 described above with reference to FIG. 1, substances 10 and 20 each with a variable refractive index are used so that the optic axes may be changed from the exterior. Reference numerals 70 and 71 designate transparent substrates; and 80 and 81, transparent electrodes.

Referring still to FIG. 7, the substances 10 and 20 with a variable refractive index are disposed alternately and in parallel with the transparent substrates 70 and 71 so that they form a kind of grating. The directions of the optic axes of the substances 10 and 20 are in parallel with the transparent substrates 70 and 71 and are perpendicular to each other in the initial state. The transparent electrodes 80 and 81 sandwich the substances with a variable refractive index 10 and 20, thereby forming a heater. The indexes of refraction of the substances 10 and 20 are controlled by an electric field or heat. In the initial state, the substance with a variable refractive index 10 have its optic axes extended in the direction of the grooves of the grating while the optic axes of the substances 20 with a variable index are in parallel with the direction in which the substances with a variable refractive index 10 and 20 (that is, the direction of the arrangement of the grating). The optic axes of the substances with a variable index 10 and 20 are mutually perpendicular to each other and are in parallel with the transparent substrates 70 and 71. In practice, as in the case of the functional optical elements described above with reference to FIG. 1, it suffices that the optic axes of the substances with a variable refractive index 10 and 20 are not in parallel with the incident light beam. It follows therefore that the difference in the direction of optic axis is dependent upon the limitations imposed on the substances with a variable refractive index used in the functional optical devices in accordance with the present invention, the polarization characteristics of a light beam used, the fabrication method and specifications of the functional optical devices.

Next the principle of optical modulation by the functional optical devices in accordance with the present invention will be described. The light which is polarized in random directions as described above can be resolved into two mutually perpendicular polarized components 40 and 41 as shown. In the case of controlling the functional optical device in accordance with the present invention by the application of an electric field, in the static state in which no electric field is applied between the opposing transparent electrodes 80 and 81, the polarized component 40 of the incident light beam 3 are polarized in the direction in parallel with the direction of the optic axis of the substance 10 with a variable refractive index so that they encounter the extraordinary index of refraction $n_e$ of the substance 10 and the normal index of refraction $n_o'$ of the substance 20 whose optic axis is perpendicular to the polarized component 40. The polarized component 41 of the incident light beam encounters the normal index of refraction $n_e$ of the substance 10 and the extraordinary index of refraction $n_o'$ of the substance 20. It follows therefore that there exist gratings having u the indexes of refraction $n_e$ and $n_o'$ and $n_o$ and $n_e'$ for the polarized components 40 and 41.

When an electric field is established between the opposing transparent electrodes 80 and 81, the optic axes of the substances with a variable refraction index 10 and 20 are deflected so that the indexes of refraction which encounter the polarized components 40 and 41 of the incident light beam 3 are varied. In this case, if the substances with a variable refractive index 10 and 20 are so controlled that they have the same index of refraction, the incident light beam 3 is uninfluenced and passes straight through the substances with a variable index of refraction.

For instance, assume that the substances with a variable refractive index 10 and 20 are made of the same positive dielectric liquid crystal (that is, $n_o = n_o'$ and $n_e = n_e'$). Then, the direction of the optic axis coincides with the direction in which the liquid crystal is oriented. As a result, when a predetermined field intensity is applied, the components 40 and 41 of the incident light beam 3 encounter the normal index of refraction $n_o$ of the liquid crystal which is oriented substantially perpendicular to the transparent electrodes 80 and 81. In the static state, the respective polarized components 40 and 41 encounter the normal index of refraction and the extraordinary index of refraction $n_e$ of the liquid crystal. When the wavelength of the incident light beam is $\lambda_0$; the difference in index of refraction between the crystals 10 and 20 is $\Delta n$; and the thickness of the liquid crystal layer is T, the diffraction efficiency $\eta_0$ of the zero-order transmitted and diffracted light diffracted by the sawtooth-waveform-like grating comprising the liquid crystal is given by the above-described equation (3). However, it should be noted that $\Delta n_{max} = |n_e - n_o|$ and $\Delta n_{min} = 0$. When the initial conditions are so selected as to satisfy the condition $\Delta n \cdot T = m\lambda_0 (m = 1, 2, ...)$, the polarized components 40 and 41 are both diffracted by the grating comprising liquid crystals and no zero-order transmitted and diffracted light is emitted. If the index of refraction of the crystal 10 is equal to that of the liquid crystal 20 so that $\Delta n = 0$, then $\eta_0 = 1$ so that all the incident light beam 3 comprising the polarized components 40 and 41 is transmitted and emitted as the zero-order light. $\Delta n$ can be arbitrarily controlled by varying the field intensity applied so that the diffraction efficiency $\eta_0$ is variable.

Figure 8A:
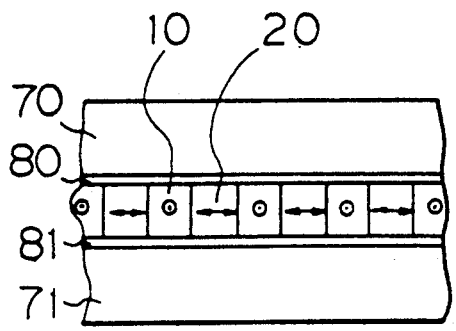
FIGS. 8(A) and (B) illustrate modifications, respectively, of the functional optical device as shown in FIG. 7 which are based upon the functional optical elements, respectively, as shown in FIGS. 1(B) and (C)
Figure 8B:
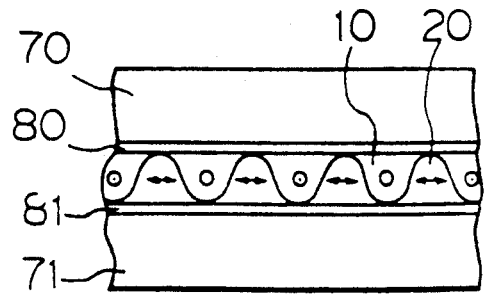

As is apparent from the above-described explanation, even when the incident light is polarized in random directions, the optical modulation of the mutually perpendicular polarized components of the incident light beam can be substantially effected at the same time by the same device so that the reduction in optical efficiency can be prevented. In this embodiment, the zero-order transmitted and diffracted light has been described as a modulating light with respect to the vertical incident light beam, but it is to be understood that the light beam 3 may be incident on the device at any angle and that the high order light may be used as modulating light. In this embodiment, as shown in FIG. 7, the sawtooth-waveform-like grating is formed by the substances with a variable refractive index 10 and 20, but it is to be understood that a rectangular-waveform-like grating as shown in FIG. 8(A) and a sinusoidal-waveform-like grating as shown in FIG. 8(B) are also formed by the substances with a variable refractive index 10 and 20. (Same reference numerals are used to designate similar parts in FIGS. 7 and 8). However, it should be noted that when the configuration of a grating is varied, the equation for obtaining the diffraction efficiency is also varied. For instance, the diffraction efficiency of the zero-order transmitted and diffracted light passing through a rectangular-waveform-like grating can be obtained from the above described Eq. (1).

Next the method for fabricating the functional optical device as shown in FIG. 7 and the evaluation of the performance thereof will be described. The same positive dielectric nematic liquid crystal is used as the substances with a variable refractive index 10 and 20 and the direction of the optic axis; that is, the index of refraction is controlled by an electric field.

FIGS. 9(A)-(D) show the steps of one example of the methods for fabricating the functional optical devices and same reference numerals are used to designate similar parts in FIGS. 7 and 9. Reference numeral 9 designates a transparent waveform-like spacer; 10, a liquid crystal oriented in the direction of the grooves of the grating; and 20, a liquid crystal oriented in the direction of the arrangement of the grating.

Figure 9A:
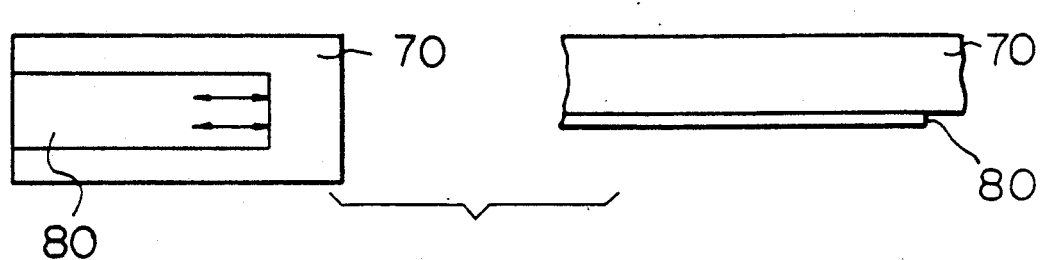
FIGS. 9(A)-(D) are views used to explain the method for fabricating the functional optical device as shown in FIG. 7.
Figure 9B:
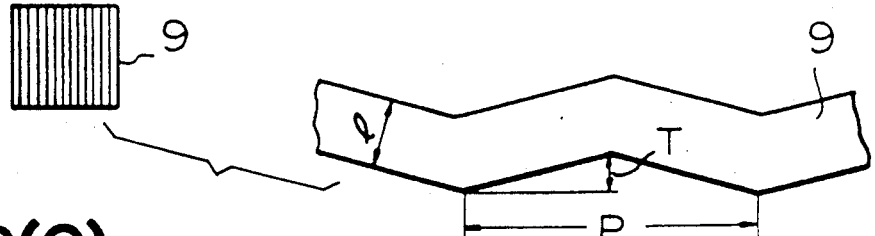

Coning 7059 glass substrate 70 (the product of Coning Corp. and $50 \times 25 \times 1$ mm$^3$) is prepared and both major surfaces of the substrate 70 are polished so that they become transparent. Next, as shown in FIG. 9(A), an ITO film is formed to the thickness of 1000Å on a predetermined portion ($10 \times 40$ mm$^2$) of one major surface of the substrate 70, thereby forming a transparent electrode 80. Thereafter SiO is deposited by an oblique deposition process so that the crystal 10' is oriented in the longitudinal direction (indicated by the double-pointed arrow) of the ITO transparent electrode 80.

Figure 9C:
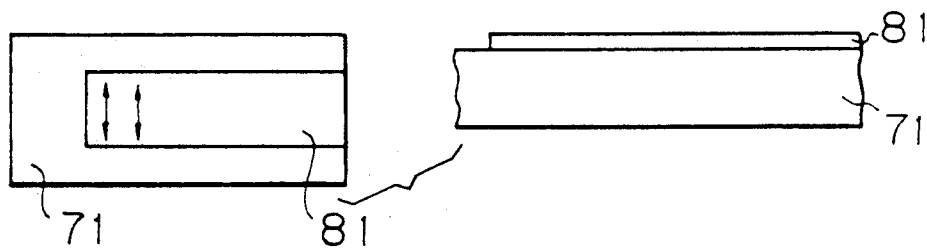

In like manner, an ITO transparent electrode 81 is formed on a glass substrate 71 and SiO is deposited by an oblique deposition process so that a crystal 10 is oriented in the widthwise direction (indicated by the double-pointed arrows) of the ITO transparent electrode 81 as shown in FIG. 9(C). Thereafter, a transparent waveform-like spacer 9 is fabricated by rolling. The pitch of the wave of the spacer 9 is 20 μm and the thickness l is 5 μm. The height T of the wave is 2.7 μm. The glass substrates 70 and 71 sandwich the transparent waveform spacer 9 in such a way that the ITO transparent electrodes 80 and 81 are in an opposed relationship with each other. Nematic liquid crystals E44 (the product of BDH and $\Delta n=0.262$) 10 and 20 are filled into the spaces and then sealed. Thus, the device as shown in FIG. 9(D) is provided.

Figure 9D:
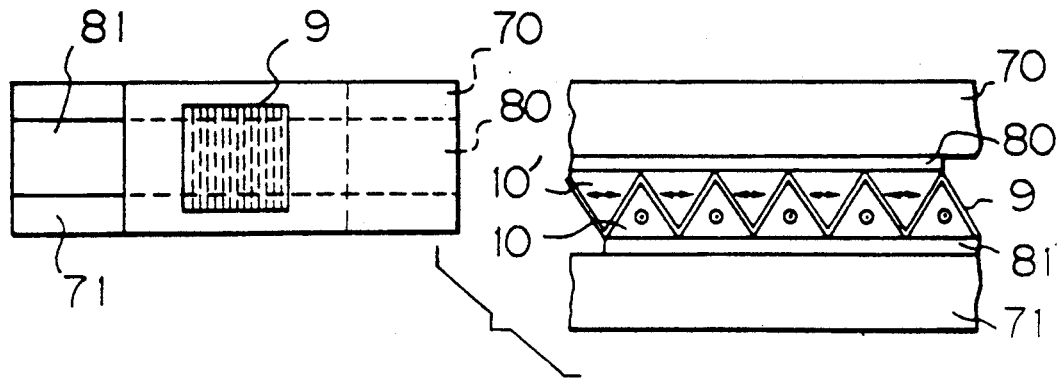

A LED with a dominant wavelength of 700 nm is used as a light source and the light having random polarized components is made to directly impinge upon the functional optical device as shown in FIG. 9(D) in order to measure the diffraction efficiency of the zero-order transmitted and diffracted light. It is seen that the diffraction efficiency varies between 1% and higher than 80% depending upon whether or not an electric field is applied.

In the case of the prior art optical modulator of the type described elsewhere, the quantity of light is reduced to less than 50% when the incident light beam passes through the polarizer, but the functional optical device in accordance with the present invention can utilize the incident light beam 100%. If the incident light beam has only one wavelength and the reflection and absorption in the device can be prevented, the above-described diffraction efficiency is further improved.

FIG. 10 shows one example of the methods for fabricating the functional optical device as shown in FIG. 8(A) which is slightly different in construction from the functional optical device described above with reference to FIG. 9. FIG. 11 is a view used to explain the method of controlling a functional optical device as shown in FIG. 10. Reference numeral 30 designates a ferroelectric liquid crystal; and 120 and 121, comb-shaped electrodes (interdigital structure). Same reference numerals are used to designate similar parts in FIGS. 9 and 10.

Next the method for fabricating a functional optical device as shown in FIG. 10 will be described. As in the embodiments described above, two glass substrates 70 and 71 ($50 \times 25 \times 1$ mm$^3$) are prepared. As shown in FIG. 10(A), an ITO transparent electrode 80 is formed 1000Å in thickness over one of the two glass substrates while the ITO transparent electrodes 120 and 121, 1000Å in thickness are formed like combs on the other glass substrate 71. As shown in FIG. 10(C), the comb-shaped electrodes 120 and 121 are alternately disposed (interlocked). PVC films are formed upon the surfaces of the glass substrates 70 and 71 and rubbed so that the liquid crystal is oriented in the direction of the comb-shaped electrodes 120 and 121. Thereafter, as shown in FIG. 10(C), the glass substrates 70 and 71 are joined to each other through the spacer in such a way that the electrodes 80, 120 and 121 are in an opposed relationship. Next the ferroelectric liquid crystal 30 (MORA-8) is filled and sealed.

In order to drive the functional optical device thus fabricated, as shown in FIG. 11(A), 0 V is applied to the transparent electrode 80; +10 V is applied to the comb-shaped electrode 120; and −10 V is applied to the comb-shaped electrode 121. Then, the optic axes of the ferroelectric liquid 30 are inclined alternately in the opposite directions as shown in FIG. 11(A) so that a grating whose indexes of refraction vary alternately to the incident light beam is provided. On the other hand, when 0 V is applied to the transparent electrode; and +10 V or −10 V is applied to both the comb-shaped electrodes 120 and 212, the optic axis of the ferroelectric liquid crystal 30 is aligned in one direction as indicated by the double-pointed arrows in FIG. 11(B) so that a grating having a uniform index of refraction is provided.

The thickness T of the liquid crystal layer, the difference $\Delta n$ in index of refraction and the incident light beam (having the wavelength of $\lambda_0$) are so selected to satisfy the above-described condition Eq. (2) when the functional optical device as shown in FIG. 10 or 11 is fabricated. The performance of the functional optical device thus fabricated is evaluated following the procedure of the above-described embodiments. The same optical performance is attained. Since the ferroelectric liquid crystal is used as the substances with a variable refractive index 10 and 20, the switching response speed is considerably increased as compared with the above-described embodiments so that it becomes possible to optically modulate an arbitrary polarized light beam at a high speed.

Figure 12A:
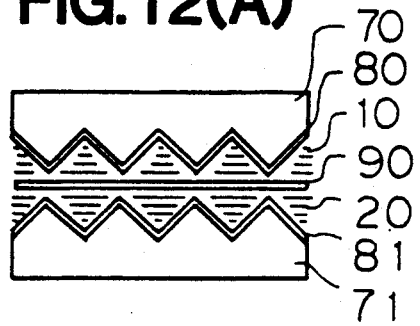
FIGS. 12(A), (B) and (C) are schematic sectional views of modifications of the functional optical device in accordance with the present invention whose fundamental constructions are substantially similar to that of the functional optical element as shown in FIG. 3(A)
Figure 12B:
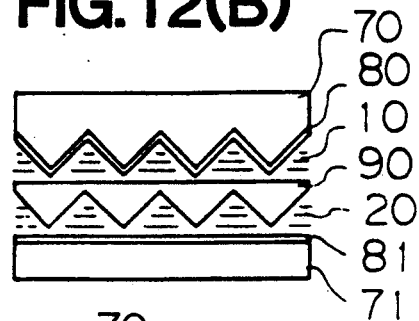
Figure 12C:
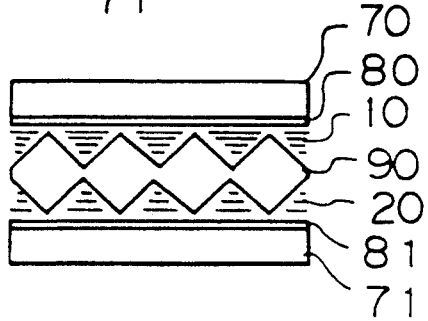
Figure 13A:
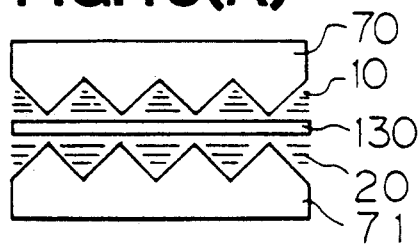
FIGS. 13(A) and (B) illustrate modifications of the functional optical device as shown in FIG. 12 in which transparent heaters are used as control means.

FIGS. 13(A), (B) and (C) are schematic sectional views illustrating some modifications of the functional optical device in accordance with the present invention which are similar in fundamental arrangement to the functional optical element as shown in FIG. 3(A). Reference numerals 100 and 20 designate substances with a variable refractive index as in the cases of the embodiments described above; 70 and 71, transparent substrates; 80 and 81, transparent electrodes; and 90, a transparent spacer. The functional optical devices as shown in FIG. 12 can be controlled by the application of an electric field, and two gratings comprising the interfaces between the transparent substrates and the substances with a variable refractive index 10 and 20 are formed in each device. In the functional optical device as shown in FIG. 12(A), the transparent substrates 70 and 71 have sawtooth-waveform-like gratings and the substances with a variable refractive index 10 and 20 are filled in the spaces between the transparent substrates 70 and 71 and the transparent spacer 90. The transparent electrodes 80 and 81 are formed over the surfaces of the transparent substrates 70 and 71. In the functional optical device as shown in FIG. 12(B), a grating is formed on the transparent substrate 70 and a grating formed on the transparent spacer 90 in opposed relationship with the other transparent substrate 71. The substances 10 and 20 are filled in the spaces defined between the transparent substrates 70 and 71 and the transparent spacer 90 and the transparent electrodes 80 and 81 are formed over the surfaces of the transparent substrates 70 and 71, respectively. In the functional optical device as shown in FIG. 12(C), the transparent electrodes are formed over the opposing surfaces of the transparent substrates 70 and 71 and the transparent spacer 90 with two gratings is interposed between the transparent substrates 70 and 71. The substances with a variable refractive index 10 and 20 are filled into the spaces defined between the transparent substrates 70 and 71 and the transparent spacer 90.

Figure 13B:
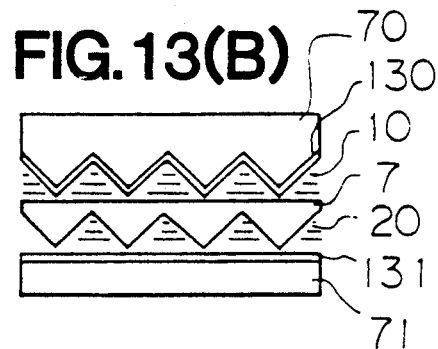

FIGS. 13(A) and (B) illustrate modifications of the functional optical devices as shown in FIG. 12 in which the substances with a variable refractive index 10 and 20 are controlled by transparent heaters 130 and 131. In the functional optical device as shown in FIG. 13(A), instead of the transparent spacer 90, a transparent heater 130 is disposed and the substances with a variable refractive index 10 and 20 are filled in the spaces defined between the transparent substrates 70 and 71 and the transparent heater 130. In the case of the functional optical device as shown in FIG. 13(B), instead of the transparent electrodes 80 and 81 as shown in FIG. 12(B), the transparent heaters 130 and 131 are used.

Figure 14:
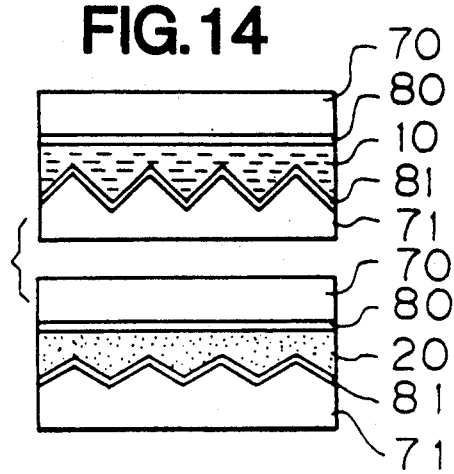
FIG. 14 illustrates a modification of the functional optical device as shown in FIG. 12 in which two gratings are arranged independently of each other.

FIG. 14 illustrates two functional optical devices each having one grating disposed in spaced apart relationship. In the initial state, the directions of the optic axes of the substances with a variable refractive index 10 and 20 are made different. A grating is formed on the transparent substrate 71 and an electric field is established between the transparent electrodes 80 and 81 formed over the opposing surfaces of the transparent substrates 70 and 71 to control the substance with a variable refractive index 10 or the substance with a variable refractive index 20.

Figure 15:
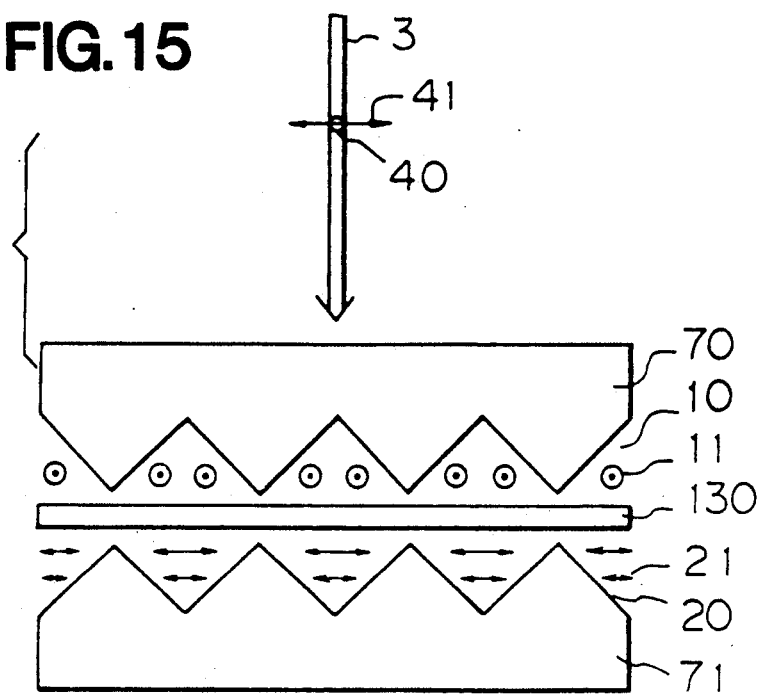
FIG. 15 is a view used to explain the mode of operation of the functional optical device as shown in FIG. 13(A)

FIG. 15 is a view used to explain the mode of operation of the functional optical device as shown in FIG. 13(A). Same reference numerals are used to designate similar parts in FIGS. 13 and 15. Reference numerals 11 and 21 represent the directions of the optic axes of the substances with a variable refractive index 10 and 20.

Referring still to FIG. 15, the optical axes of the substance with a variable refractive index 10 in the first layer are in parallel with the direction 11 of the grooves of the grating while the optical axes of the substance with a variable refractive index 20 in the second layer are oriented in the direction 21 of the arrangement of the grating.

In the static state in which no electric field is applied, in the first layer, the polarized component 40 of the incident light beam 3 encounters the extraordinary index of refraction $n_e$ of the substance with a variable refractive index 10 while the polarized component 41 encounters the normal index of refraction $n_o$ thereof In the second layer, the polarized component 40 encounters the normal index of refraction $n'_o$ of the substance with a variable refractive index 20 while the polarized component 41 encounters the extraordinary index of refraction $n'_e$ thereof. When the index of refraction of the transparent substrate 70 which defines a first-layer grating is $n_g$, the index of refraction of the transparent substrate 71 which defines a second-layer grating is $n_g'$; the wavelength of the incident light beam is $\lambda_0$; and the thickness of the first and second layer gratings are $T_1$ and $T_2$, respectively, the diffraction efficiencies $\eta_{01}$ and $0\eta_{02}$ of the zero-order transmitted diffracted light passing through the first and second layer gratings are expressed by the following equations, respectively:

$$\eta_{01} = \sin c^2(\pi \cdot \Delta n_1 \cdot T_1 / \lambda_0) \qquad (10)$$

and $$\eta_{02} = \sin c^2(\pi \cdot \Delta n_2 \cdot T_2 / \lambda_0) \qquad (11)$$

It is seen from the above equations (10) and (11) that when $\Delta n = 0$ or $\Delta n' = 0$, $\eta_{01} = 1$ or $\eta_{02} = 1$ and that when the condition $\Delta nT = m\lambda_0$ or $\Delta n'T = m\lambda_0$ (m = 1, 2, 3, . . . ) is satisfied, $\eta_{01}10$ or $\eta_{02} = 0$.

If the condition $n_o = n_g$ or $n_e = n_g$ is satisfied in the first layer, one of the polarized components 40 and 41 passes straight through the first layer without being influenced while the other polarized component is modulated and diffracted in accordance with Eq. (10). In like manner, when the condition $n'_o = n'_g$ or $n'_e = n_g'$ is satisfied in the second layer, one of the polarized components 40 and 41 passes straight through the second layer without being influenced while the other polarized component is modulated and diffracted in accordance with Eq. (11).

When an electric current is made to flow through the transparent heater so that the substances with a variable refractive index 10 and 20 are heated, the directions of the optic axes of the substances with a variable refractive index 10 and 20 are shifted so that the indexes of refraction which the polarized components 40 and 41 encounter are varied. As a result, in the first layer, the modulation is effected according to Eq. (10) while in the second layer, the modulation is effected according to Eq. (11).

For instance, assume that the substances with a variable refractive index 10 and 20 consist of the same liquid crystal. Then $n_e = n'_e$ and $n_o = n'_o$. When the initial conditions are set in such a way that $n_g = n'_g = n_o$, $T_1 = T_2$ and $|n_e - n_g| \cdot T_1 = m\lambda_0$, Eq. (10) gives the diffraction efficiency of the zero-order light passing through the first and second layers.

The index of refraction of the transparent heater 130 is selected to be substantially equal to $n_g$. In this case, in the static state, the polarized component 40 of the incident light beam 3 passes straight through the first layer while being influenced while the diffraction efficiency $\eta_0$ of the polarized component 41 becomes zero according to Eq. (10) so that no zero-order light is emitted and the incident light beam all becomes high order light. According to Eq. (10), the diffraction efficiency $\eta_0$ of the polarized component 41 becomes zero in the second layer so that no zero-order light is emitted and the incident light beam all becomes high order light. The polarized component 41 becomes high order light which passes through the second layer while being influenced. As a result, there exists no light emitted in the direction of zero-order. When a predetermined electric field is applied so that the directions of the optic axes (the directions of orientations) of the liquid crystals 10 and 20 are made perpendicular to the surface of the grating; that is, when the directions of the optic axes are aligned with the direction of the incident light beam, the polarized components 40 and 41 encounter the normal index of refraction $n_o$ of the liquid crystal in the first and second layers so that they pass without being influenced and become zero-order transmitted light. As a result, by applying an electric field, the diffraction efficiency of the zero order transmitted and diffracted light of the light having an arbitary polarization characteristic can be controlled. So far the zero-order diffracted light has been described as the modulating light, but it is of course possible to use high order light.

In addition, so far the optic axes of the substances with a variable refractive index 10 and 20 have been described as being mutually perpendicular, but it is to be understood that it is not needed that they are mutually perpendicular and it suffices that the directions of the optic axes of the substances with a variable refractive index 10 and 20 are misaligned with the direction of the incident light beam. It follows therefore that the difference between the directions of the optic axes is dependent upon the limitations of the substances, the polarization characteristic of an incident light beam used, the fabrication method and specifications of the functional optical device. In the embodiments as shown in FIG. 12-15, the directions of the gratings in the respective layers are same, but it is to be understood that the functional optical devices in accordance with the present invention is not dependent upon the direction of orientation of the grating at all and that a plurality of gratings may be oriented in any direction as long as the optical modulation is adversely affected.

Figure 16A:
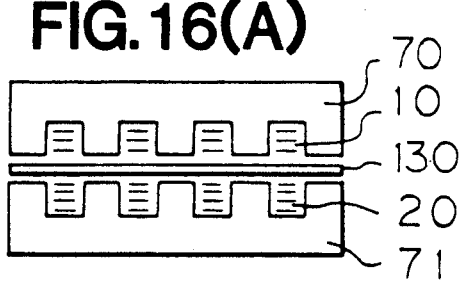
FIGS. 16(A) and (B) illustrate two modifications, respectively, of the functional optical device as shown in FIG. 13(A) which are based upon the functional optical elements, respectively, as shown in FIGS. 3(B) and (C)

FIGS. 16(A) and (B) illustrate modifications of the functional optical device as shown in FIG. 13(A) which are based upon the functional optical elements, respectively, as shown in FIGS. 3(B) and (C).

Figure 16B:
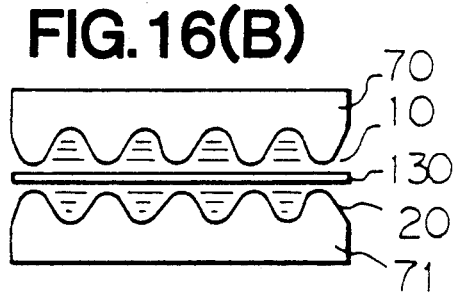

In the case of the functional optical device as shown in FIG. 16(A), the transparent substrates 70 and 71 define two rectangular-waveform-like gratings through the heater 130 and in the like manner, in the case of the functional optical device as shown in FIG. 16 (B), two sinusoidal-waveform-like gratings are defined.

The optical modulator in accordance with the present invention has the function of effecting the optical modulation independently of the configuration of the grating, but when the configurations of the gratings are different, the diffraction efficiency must be derived from an equation different from Eqs. (10) and (11). For instance, in the case of the rectangular-waveform-like grating, the diffraction efficiency is derived from Eq. (1).

Gratings may have various configurations and the configuration of a grating must be determined depending upon the easiness with which the grating is fabricated. The sawtooth-waveform-like gratings used in the above-described embodiments have the excellent diffraction effect not only for a monochromatic light beam but also for white light.

Referring next to FIG. 17, the method of fabrication of the functional optical device as shown in FIG. 12(A) and the evaluation of the performance thereof will be described. Same reference numerals are used to designate similar parts in FIGS. 12 and 17.

Figure 17A:
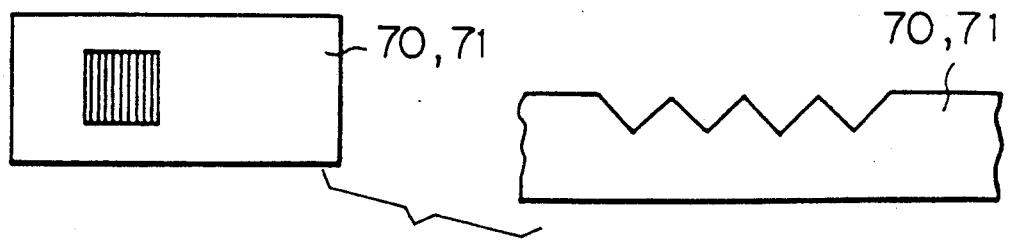
FIGS. 17(A), (B) and (C) are views used to explain the steps of fabricating the functional optical device as shown in FIG. 13(A)
Figure 17B:
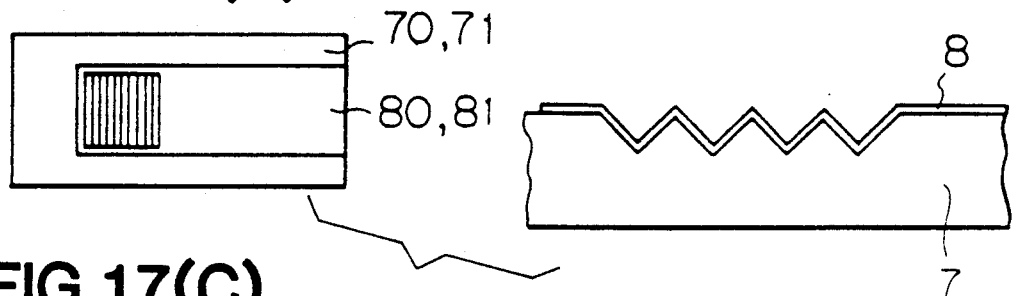
Figure 17C:
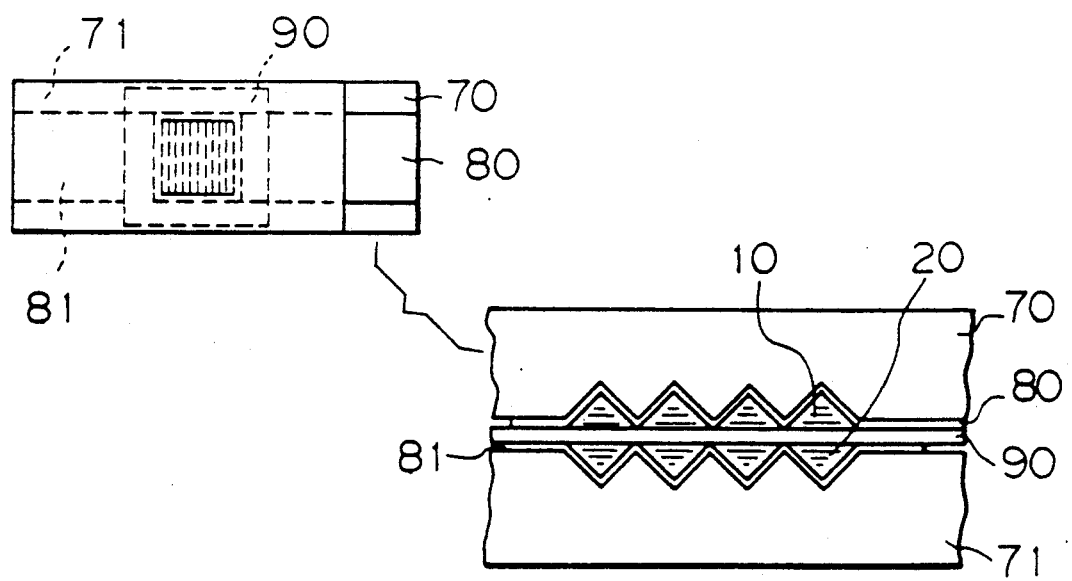

Both the major surfaces of a transparent PBMA resin substrate 70 ($50 \times w5 \times 1.5$ mm$^3$, $n_g = 1.56$) are made transparent and flat and, as shown in FIG. 17(A), a triangular-waveform-like grating 3.0 $\mu$m in pitch and 2.6 $\mu$m in depth is formed on a predetermined portion ($10 \times 10$ mm$^2$) of one major surface of the substrate 70 by an embossing process. Thereafter, as shown in FIG. 17(B), an ITO film 80 1000Å in thickness is formed in the form of a band over the substrate 70 including the grating. Another transparent PBMA substrate 71 is prepared in a manner substantially similar to that described above. A transparent Teflon spacer 90 5 $\mu$m in thickness whose upper and lower surfaces are so treated as to be mutually perpendicular is sandwiched between the transparent PBMA substrates 70 and 71 and a positive dielectric liquid crystal MBBA 10 and 20 ($n_o = 1.56$ and $n_e = 1.786$) is filled into the spaces defined between the upper and lower gratings and the spacer 90, whereby the device as shown in FIG. 17(C) is provided.

When the D line ($\lambda = 589.3$ nm) emitted from a Na light source and having randomly polarized components is incident on the optical modulator as shown in FIG. 17 (C), almost no zero-order transmitted and diffracted light is emitted in the static state in which no voltage is applied, and the transmission factor of the incident light beam is less than 1%. When a rectangular waveform of a frequency of 1 kHz and of an effective voltage of 10 V is applied, almost all the incident light beam is transmitted through the optical modulator without being influenced and the transmission factor is higher than 80%. When the voltage is applied, the rise time is 1 m sec while the fall time is 5 m sec.

As described above, it is confirmed that the functional optical device in accordance with the present invention effectively operates in response to an incident light beam having an arbitrary polarization characteristic.

Next referring to FIG. 18, a still further embodiment of the present invention will be described. A transparent PMMA resin film 91 is rolled by a heated roller having rectangular-waveform-like grooves so that rectangular-waveform-like gratings 3 $\mu$m in pitch and 2.1 $\mu$m in depth are formed on both the major surface of the film 91 in such a way that the directions of grooves in the upper and lower surfaces are mutually perpendicular. Next, both the major surfaces of two BK7 substrates ($50 \times 25 \times 1$ mm$^3$ and $n_g = 1.490$) are made transparent and flat and an ITO film 1000Å in thickness is formed on a predetermined portion ($10 \times 40$ mm$^3$) of one major surface of each substrate and then the film 91 having the gratings is sandwiched as a spacer between the BK7 substrates. Thereafter a positive dielectric liquid crystal ZLI-2141-000 (the product of Merk Corp.: $n_o = 1.49$ and $n_e = 1.64$) is filled into the spaces defined between the substrates and the spacer. In this case, the liquid crystals are oriented in accordance with the gratings of the film or spacer 91 so that the orientations of the upper and lower liquid crystal layers are mutually perpendicular. A He-Ne laser beam ($\lambda = 632.8$ nm) having randomly polarized components is made incident upon the optical modulator thus fabricated and following the procedure described above, the performance of the optical modulator is evaluated. The results are substantially similar to those obtained from the above-described various embodiments.

In the functional optical devices described above with reference to FIGS. 12-18, the spacer is interposed between the two diffraction gratings, but it is to be understood that this spacer is not necessarily needed. For instance, in the case of a functional optical device in which liquid crystals are used as substances with a variable refractive index, the functional optical device operates satisfactorily as long as the upper and lower liquid crystal layers are oriented in predetermined directions, respectively. Less problems are encountered when electro-optical crystals are used. In this case, the spacer is eliminated so that the functional optical device becomes simple in construction. Furthermore, there is an advantage that when the functional optical device is controlled by the application of an electric field, a voltage used can be lowered. It is considered that the liquid crystal is most preferable as the so-called substance with a variable refractive index in which the optical conditions are controllable. The reason is that as compared with other substances which exhibit similar optical properties, the liquid crystal is inexpensive. In addition, the liquid crystal can be easily controlled by the application of heat or electric field. As a result, the above-described difference $\Delta n$ ($=n_e-n_o$) is increased so that the functional optical devices of the present invention may be applied in various fields.

FIGS. 19(A)-(D) are schematic sectional views of further modifications of the functional optical device in accordance with the present invention which are based on the functional optical element as shown in FIG. 5(B). Same reference numerals are used to designate similar parts in the above-described embodiments and in these embodiments.

Figure 19A:
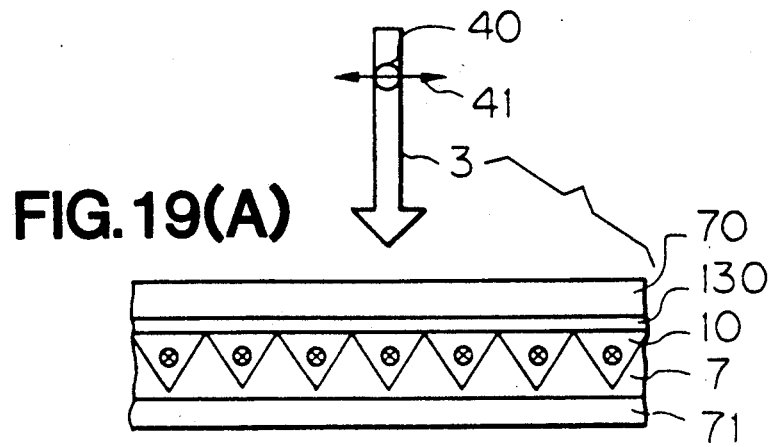
FIGS. 19(A)-(D) illustrate variations of the fundamental optical device in accordance with the present invention which are based on the functional optical element as shown in FIG. 5(B)
Figure 19B:
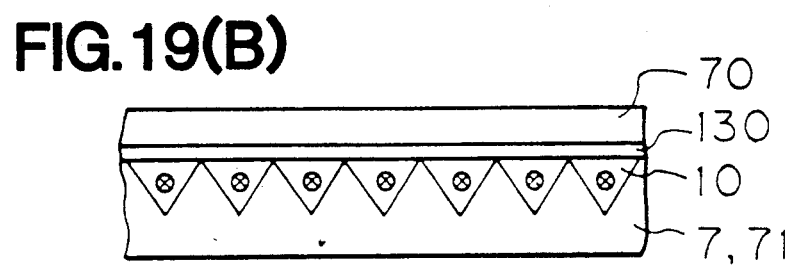
Figure 19C:
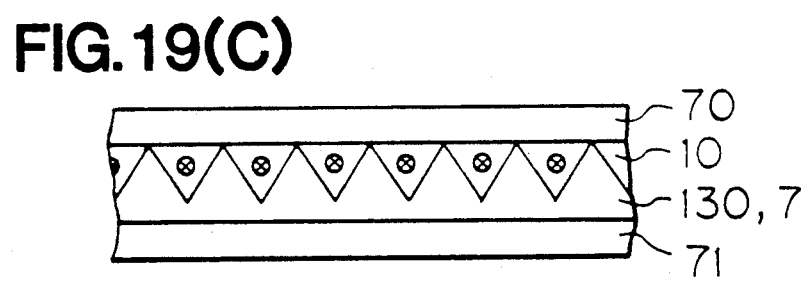
Figure 19D:
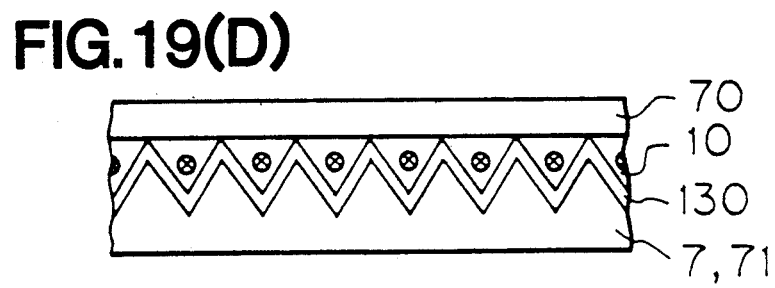

In the case of the functional optical device as shown in FIG. 19(A), a sawtooth-waveform-like grating is defined by, for instance, a substance with a variable refractive index 10 and an optically isotropic substance 7 and a transparent heater 130 contacts the refractive index 10 whose optical properties are variable. The optical properties of the substance with a variable refractive index 10 are varied by the transparent heater 130 so that the characteristic of the grating is varied to modulate an incident light beam 3. The functional optical devices as shown in FIGS. 19(B)-(D) have all a sawtooth-waveform-like grating and the optical properties of the substance with a variable refractive index 10 are controlled by the heat dissipated from the transparent heater 130. In the case of the functional optical device as shown in FIG. 19(B), a transparent substrate 71 itself is a grating or an optically isotropic substance 7. In the case of the functional optical device as shown in FIG. 19(C), the transparent heater 130 itself is a grating or optically isotropic substance 7. In the case of the functional optical device as shown in FIG. 19(D), the transparent heater 130 is formed over the surface of the grating.

Figure 20A:
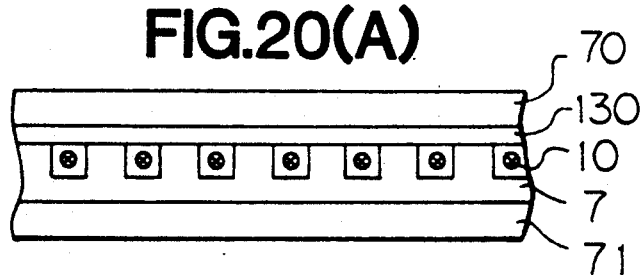
FIGS. 20(A) and (B) illustrate modifications of the functional optical device as shown in FIG. 19(A) in which the configurations of the gratings are made different.
Figure 20B:
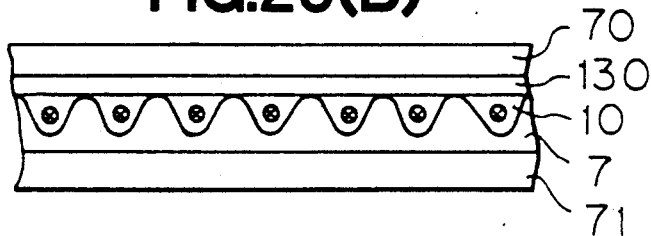

FIGS. 20(A) and (B) illustrate the modifications of the functional optical device as shown in FIG. 19(A) in which the configurations of the gratings are different. In the case of the functional optical device as shown in FIG. 20(A), the interface between the substance 10 whose optical properties are variable and the optically isotropic substance 7 defines a grating. In the case of the functional optical device as shown in FIG. 20(B), a sinusoidal-waveform-like grating is defined. The transparent heater 130 is also used in order to control the optical properties of the substance with a variable refractive index.

In the embodiments described above with reference to FIGS. 19 and 20, the optic axes of the substance with a variable refractive index 10 are in parallel with the grooves of the grating; that is, they are perpendicular to FIG. 19 or 20. However, it to be understood that they may be oriented in any direction as long as they are not in parallel with the direction of an incident light beam in the initial state. However, it is preferable that the angle $\theta$ relative to the direction of the incident light beam in a plane containing the both directions of the optic axes is almost equal to or higher than 30° because the functional optical device operates satisfactorily. This angle $\theta$ is determined depending upon the substance with a variable refractive index, the polarization characteristics of an incident light beam, the method for fabricating the functional optical device and specifications thereof.

Figure 21:
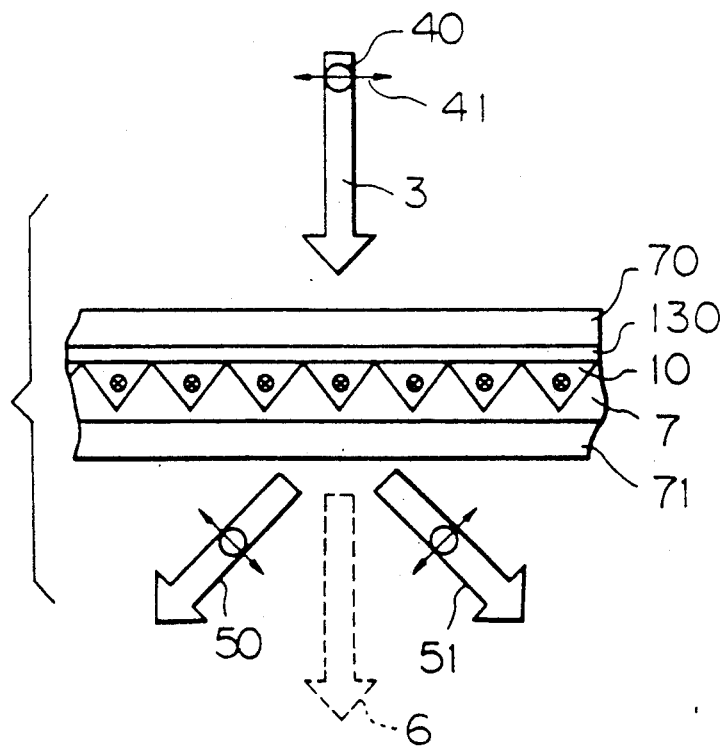
FIG. 21 is a view used to explain the mode of operation of the functional optical device as shown in FIG. 19(A)

FIG. 21 is a view used to explain the mode of operation of the functional optical device as shown in FIG. 19(A) and same reference numerals are used to designate similar parts in FIGS. 19 and 21.

In general, the incident light beam 3 having randomly polarized components can be resolved into two mutually perpendicular polarized components 40 and 41 as shown in FIG. 21. In the static state in which no electric current flows through the transparent heater 130 of the functional optical device, the substance with a variable refractive index 10 is optically anisotropic and its optic axes are in parallel with the grooves of the grating. In this case, the polarized component 40 of the incident light beam 3 is coincident with the direction of the optic axes of the substance with a variable refractive index 10 and encounters the normal index of refraction $n_o$. When the incident light beam 3 phases through the optically isotropic substance 7, it encounters the index of refraction $n_g$ regardless of the polarized components. As a result, the mutually perpendicular polarized components 40 and 41 of the incident light beam 3 encounter the gratings having the indexes of refraction $n_o$ and $n_g$ and the indexes of refraction $n_o$ and $n_g$, respectively.

Next the transparent heater 130 heats the substance with a variable refractive index 10 so that the temperature thereof becomes higher than a critical temperature. Then, the substance with a variable refractive index 10 is transformed into an optically isotropic substance so that arbitrary polarized components; that is, the polarized components 40 and 41 of the incident light beam 3 encounter the index of refraction $n_i$ of the substance with a variable refractive index 10 which is now optically isotropic. As a result, an arbitrary polarized component encounters the grating having the indexes of refraction $n_i$ and $n_g$.

When the wavelength of the incident light beam 3 is $\lambda_0$; the difference in index of refraction between the substances 10 and 7 which define a grating for the mutually perpendicular polarized components of the incident light 3 is $\Delta n$; and the thickness of the grating layer is T, the diffraction efficiency $\eta_0$ of the zero-order transmitted and diffracted light passing through the sawtooth-waveform-like grating as shown in FIG. 21 is derived from the above-described Eq. (3).

According to Eq. (3), when $\Delta n \cdot T = 0$, $\eta_0 = 1$. That is, only the zero-order transmitted light 6 is diffracted and no higher order light 50 and 51 is derived. When $\Delta n \cdot T = m\lambda_0 (m=1, 2, 3, \ldots)$, $\eta_0 = 0$. Therefore, no zero order transmitted and diffracted light 6 is derived and the energy of the incident light beam 5 almost becomes the energies of the high order reflected light rays 50 and 51 which are emitted. Therefore, in the case of this embodiment, when the indexes of refraction $n_e$, $n_o$ and $n_i$ of the substance with a variable refractive index 10, the index of refraction $n_g$ of the optically isotropic substance 7 and the wavelength $\lambda_0$ of the incident light beam are so selected to satisfy the following condition (12), both the polarized components 40 and 41 of the incident beam 3 satisfy the condition that $\Delta n \cdot T = m\lambda_0$ so that in the static state no zero-order transmitted and diffracted light 6 is emitted. When the transparent heater 130 is energized so that the substance with a variable refractive index 10 becomes an optically isotropic substance (with an index of refraction $n_i$), all the incident light beam 3 passes through the grating and is emitted as the zero-order transmitted and diffracted light 6.

$$|n_e - n_g| \cdot T = m_1 \lambda_0 (m = 1, 2, \ldots)$$

$$|n_o - n_g| \cdot T = m_2 \lambda_0 (m = 1, 2, \ldots) \quad (12)$$

and $$n_g = n_i$$

As is apparent from the above explanation, it is possible to modulate even an incident light beam having randomly polarized components when the optical modulation of the mutually perpendicular components thereof are subjected to the optical modulation at the same time by the same device, without causing the decrease of the optical efficiency. In this embodiment, the zero-order transmitted and diffracted light is a modulating light ray for the vertically incident light beam, but it is to be understood that the light beam may be incident at any angle of incidence and that the high order light may be used as modulating light.

As described above with reference to FIG. 20, the grating defined by the substance with a variable refractive index 10 and the optically isotropic substance 7 may have various configurations and the diffraction efficiency $\eta_0$ of the zero-order transmitted and diffracted light is derived from an equation which varies depending upon the configuration of the grating. For instance, it may be derived from Eq. (1) in the case of a rectangular-waveform-like grating as shown in FIG. 20(A).

In the case of Eq. (1), when $\Delta nT = l_1\lambda_0$ ($l_1 = 0, 1, 2, \ldots$), $\eta_0 = 1$ and when $\Delta nT = (\frac{1}{2} + l_2)\lambda_0$ ($l_2 = 0, 1, 2, \ldots$), $\eta_0 = 0$.

Next the method for fabricating the functional optical device as shown in FIG. 20(A) and the evaluation of the performance thereof will be described. The substance with a variable refractive index 10 consists of nematic liquid crystal and the optically isotropic substance 7 consists of a sheet of optical glass.

Figure 22A:
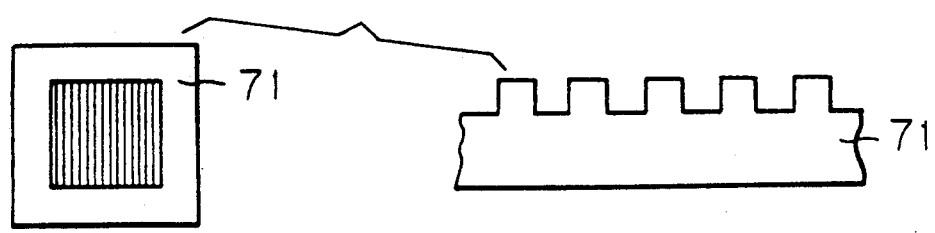
FIGS. 22(A), (B) and (C) are views used to explain the steps of fabricating the functional optical device as shown in FIG. 20(A).

Referring now to FIGS. 22(A), (B) and (C), same reference numerals are used in FIGS. 20 and 22. Reference numeral 100 designates an aluminum film.

Both the major surfaces of BaF$_2$ glass (25 × 25 × 1 mm$^3$) are optically polished and cleaned to prepare a glass plate 71. RD-2000D (negative resist, the product of Hitachi Seisakusho K.K.) is spinner coated over the surface of the glass substrate 71 to form a resist film 8000Å in thickness. The glass substrate 71 is prebaked at 140° C. for 20 minutes and thereafter, the masking process, the exposure process with far ultraviolet rays, the development process and the rinsing process are carried out so that a relief-like resist grating with a pitch of 6 μm is formed. Thereafter, the glass substrate 7 is etched to the depth of 6.3 μm by an ion etching process using a gas mixture of CF$_4$ and O$_2$, whereby a substrate as shown in FIG. 22(A) is provided.

Figure 22B:
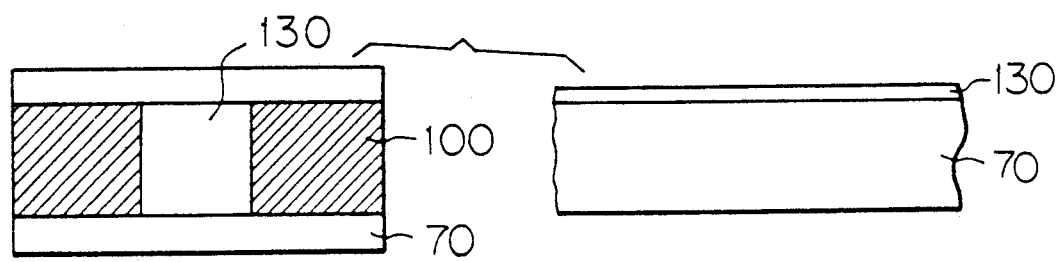

Following the procedure for obtaining the glass substrate 71, a BaF$_2$ glass substrate 70 (50 × 25 × 1 mm$^3$) is prepared and an ITO film is formed as a transparent heater 130 on a predetermined area of the glass plate 70 as shown in FIG. 22(B). Thereafter leads or conductors comprising the aluminum films 100 are deposited on both sides of the ITO film by a molecular beam evaporation process to the thickness of 1000Å.

Figure 22C:
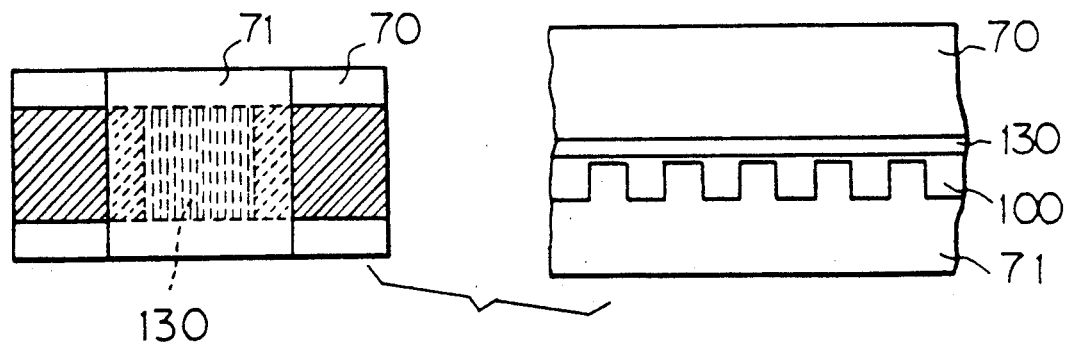

The two substrates 70 and 71 are joined together in such a way that the grating region and the heater region are in opposed relationship with each other and a nematic liquid crystal E7 (the product of BDH Corp.) 100 is filled and sealed (See FIG. 22(C)).

A light beam which is emitted from a Ne laser light source (=6328Å) and which has randomly polarized components is made to directly and vertically incident and the diffraction efficiency of the zero-order transmitted and diffracted light is measured. The ambient temperature of the measurement system is maintained at about 20° C. and when no current flows through the transparent electrode 130, the liquid crystal is oriented is parallel with the direction of the grooves of the grating. In this case, the polarized component in parallel with the direction of the arrangement of the grating encounters the normal index of refraction $n_o = 1.52$ of the liquid crystal 100 while the polarized component is parallel with the grooves of the grating encounter the extraordinary index of refraction $n_e$ of the liquid crystal 100. Both the polarized components encounter the index $n_g = 1.57$ of the glass substrate 71. As a result, according to Eq. (1), $\eta_0 = 0$ for both the polarized components so that all the incident light beam 3 is emitted as high order light while no zero-order transmitted and diffracted light is derived. When the transparent heater 3 is energized, the liquid crystal 100 becomes a liquid layer or an optically isotropic substance, exhibiting the index of refraction $n_i = 1.57$. Since $n_i = n_g$, no grating exists for the incident light beam. ($\Delta n \cdot T = 0$). Therefore the incident light beam passes through the functional optical device without being influenced and is emitted in the direction of zero-order. According the results of the measurement, the diffraction efficiency of the zero-order transmitted and diffracted light varies over the range between 1% and 80% depending upon whether or not the transparent heater 130 is energized.

Figure 18:
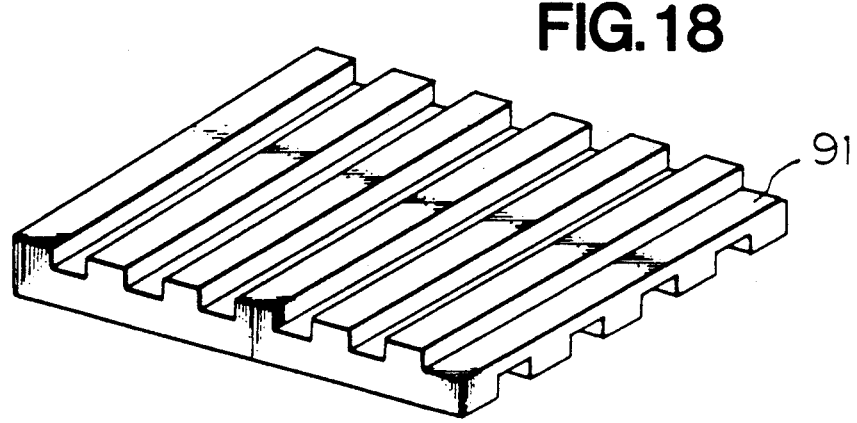
FIG. 18 is a perspective view of a space whose major upper and lower surfaces are formed with mutually perpendicular gratings.

As described above, the functional optical devices shown in FIGS. 19–22 are simple in construction as compared with the functional optical devices shown in FIG. 18 and the preceding figures and can be easily fabricated as an optically anisotropic substance constituting a part of the diffraction grating. Especially in cases of all the embodiments described above, the fabrication of the functional optical devices which are controlled by heat is easier than the fabrication of the functional optical devices which are controlled by the application of an electric field, but in general the response speed or time is faster in the functional optical devices of the type which are controlled by the application of an electric field or a magnetic field.

In the functional optical devices described above, substantially, all the component parts are transparent to the incident light beam. That is, they are a transmission type optical modulator, but it is to be understood that the present invention is not limited to such functional optical devices described above. For instance, predetermined component parts such as substrates and other optical elements are made of materials capable of reflecting light or a reflecting film can be formed over a predetermined portion of an optical element, whereby the reflection type functional optical devices can be provided.

In addition to an electric field or heat (temperature) used as means for controlling the optical properties of the optically anisotropic substances and the substances with a variable refractive index from the exterior thereof, electric current, pressure or magnetic field can be used.

The methods for fabricating the gratings of the above-described embodiments are a method in which a photolithographic process and a dry etching process are combined, a replica method in which thermally setting resins or resins which are hardened or cured when exposed to the ultraviolet rays, a cutting method using a ruling engine, an embossing method and so on.

Various types of functional optical elements and devices have been described in detail with reference to FIGS. 1–22 and when the problems encountered in the fabrication of such functional optical elements and devices and the functions thereof are taken into consideration, the functional optical elements described with reference to FIGS. 1–5 and the functional optical devices described with reference to FIGS. 12–19 can be generally provided in a simple manner.

It is of course possible to combine the functional optical elements and devices in accordance with the present invention so that various functions can be accomplished. Especially since the functional optical elements and devices of the present invention function satisfactorily for any incident light beam having arbitrary polarization characteristics, the decrease in optical efficiency caused by the combinations of various functional optical elements and devices is considerably small as compared with the prior art technique.

Even though the functional optical elements and devices in accordance with the present invention use optically anisotropic substances as component parts of a fundamental construction, it is possible to carry out optical modulation, without the use of polarizers, of any light beam having arbitrary polarization characteristics. That is, the present invention can provide functional optical elements (devices) which has a high degree of optical efficiency and is simple in construction and adapted to be mass produced. As described above, the present invention provides functional optical elements (devices) which can be modified in various manners and applied in various fields and used in various optical devices and instruments.

So far only the typical embodiments of the present invention has been described in this specification and it will be appreciated by those skilled in the art that variations, alternations and/or modifications may be resorted to without departing from the true spirit of the present invention.

What is claimed is:

1. A light modulating device for diffracting-modulating a light including mutually perpendicular polarization components, comprising:
   a first substrate having a flat plate-shaped electrode formed on a first surface thereof;
   a second substrate set so that a second surface thereof faces said first surface and an intermediate layer is formed between said second substrate sand said first substrate, with first and second comb-shaped electrodes being formed on said second surface, each of said first and second comb-shaped electrodes having a plurality of electrode elements alternately arranged;
   ferroelectric liquid crystal for filling said intermediate layer, wherein said first and second surfaces are provided with films for orienting said liquid crystal so that optic axes of said liquid crystal are oriented in a predetermined direction by said films; and
   voltage applying means for applying a positive voltage between said flat plate-shaped electrode and said first comb-shaped electrode and applying a negative voltage between said flat plate-shaped electrode and said second comb-shaped electrode, wherein the optic axis of said liquid crystal of a first portion of said intermediate layer between said flat plate-shaped electrode and said first comb-shaped electrode is inclined in a first direction and the optic axis of said liquid crystal of a second portion of said intermediate layer between said flat plate-shaped electrode and said second comb-shaped electrode is inclined in a second direction transverse to said first direction by application of positive and negative voltages, so that a diffraction grating for diffracting said light is formed in said intermediate layer.

2. A light modulating device for diffracting-modulating a light including mutually perpendicular polarization components, comprising:
   a first grating structure;
   a first surface facing said first grating structure, with a first intermediate layer being formed between said first surface and said first grating structure;
   a first liquid crystal for filling said first intermediate layer, said first liquid crystal having liquid crystal molecules oriented in a first direction which is substantially parallel with said first surface;
   a second grating structure;
   a second surface facing said second grating structure, with a second intermediate layer being formed between said second surface and said second grating structure;
   a second liquid crystal for filing said second intermediate layer, said second liquid crystal having liquid crystal molecules oriented in a second direction which is substantially parallel with said second surface and perpendicular to said first direction; and
   means for applying an electric field to said first and second intermediate layers, with said electric field being applied substantially simultaneously to said first and second intermediate layers in a direction perpendicular to said first and second surfaces so that each liquid crystal molecule of said first and second liquid crystals is substantially simultaneously oriented in a third direction which is perpendicular to said first and second surfaces, wherein
   said first grating structure, said first intermediate layer, said second grating structure and said second intermediate layer are provided along an optical path of the light, and said first and second liquid crystals respectively assume the same normal index of refraction and the same extraordinary index of refraction, and said first and second grating structures are disposed to assume a refractive index substantially equal to said normal index of refraction, wherein said first liquid crystal is oriented in the first direction and said second liquid crystal is oriented in the second direction when one of the polarization components of the light is diffracted by said first grating structure and the other polarization component of the light is diffracted by said second grating structure, and said first and second liquid crystals are oriented in said third direction when each of the polarization components of the light is not substantially diffracted by said first and second grating structures.

3. A light modulating device for diffracting-modulating a light including mutually perpendicular components, comprising:

a first grating structure formed on a first substrate, a plurality of grooves of said first grating structure extending in a predetermined direction;

a second grating structure formed on a second substrate, a plurality of grooves of said second grating structure extending in said predetermined direction, with said second substrate being set so that said second grating structure faces said first grating structure;

a spacer substrate provided between said first and second grating structures, said spacer substrate having a first surface facing said first grating structure and a second surface facing said second grating structure, with a first intermediate layer being formed between said first surface and said first grating structure and a second intermediate layer being formed between said second surface and said second grating structure;

liquid crystal for filling said intermediate layers, with a first portion of said liquid crystal filling said first intermediate layer and a second portion of said liquid crystal filling said second intermediate layer, wherein said liquid crystal in said first portion is oriented in a first direction substantially parallel with said first surface and said liquid crystal of said second portion is oriented in a second direction which is substantially parallel with said second surface and perpendicular to said first direction; and means for applying an electric field to said first and second intermediate layers, with said electric field being applied substantially simultaneously to said first and second intermediate layers in a direction perpendicular to said first and second surfaces so that each liquid crystal molecule of said first and second portions is substantially simultaneously oriented in a third direction which is perpendicular to said first and second surfaces, wherein said liquid crystal assumes a normal index of refraction and an extraordinary index of refraction, and said first and second grating structures are set so as to assume a refractive index substantially equal to said normal index of refraction, wherein said liquid crystal of said first portion is oriented in said first direction and said liquid crystal of said second portion is oriented in said second direction when one of the polarization components of the light is diffracted by said first grating structure and the other polarization component of the light is diffracted by said second grating structure, and said liquid crystals of said first and second portions are oriented in said third direction when each of the polarization components of the light is not substantially diffracted by said first and second grating structures.

4. A light modulating device for diffracting-modulating a light including mutually perpendicular polarization components, comprising:

a first substrate having a first surface;

a second substrate having a second surface, said second substrate being st so that said second surface faces said first surface;

a spacer substrate provided between said first and second surfaces, with a first grating structure being formed on a first surface of said spacer substrate and a second grating structure being formed on a second surface of said spacer substrate, with a first intermediate layer being formed between said first grating structure and said first surface, and a second intermediate layer being formed between said second grating structure and said second surface, wherein a plurality of grooves of said first grating structure extend in a first direction substantially perpendicular to a second direction in which a plurality of grooves of said second grating structure extend;

liquid crystal for filing said intermediate layers, with a first portion of said liquid crystal filling said first intermediate layer, and a second portion of said liquid crystal filing said second intermediate layer, wherein said liquid crystal of said first portion is oriented in said first direction and said liquid crystal of said second portion is oriented in said second direction;

means for applying an electric field to said first and second intermediate layers, with said electric field being applied substantially simultaneously to said first and second intermediate layers in a direction perpendicular to said first and second surfaces, wherein liquid crystal molecules of said first and second portions are substantially simultaneously oriented in a third direction which is perpendicular to said first and second surfaces, wherein said liquid crystal assumes a normal index of refraction and an extraordinary index of refraction, and said first and second grating structures are set so as to assume a refractive index substantially equal to said normal index of refraction, wherein said liquid crystal of said first portion is oriented in said first direction and said liquid crystal of said second portion is oriented in said second direction when one of the polarization components of the light is diffracted by said first grating structure and the other polarization component is diffracted by said second grating structure, and each liquid crystal of said first and second portions is oriented in said third direction when each of the polarization components of the light is not substantially diffracted by said first and second grating structures.

* * * * *

UNITED STATES PATENT AND TRADEMARK OFFICE
CERTIFICATE OF CORRECTION

PATENT NO. : 5,013,141
DATED : May 7, 1991
INVENTOR(S) : Hajime Sakata

It is certified that error appears in the above-identified patent and that said Letters Patent is hereby corrected as shown below:

On title page item
[56] FOREIGN PATENT DOCUMENTS:

"33341818 4/1982 Fed. Rep. of Germany" should read --3334181 3/1984 Fed. Rep. of Germany--.

COLUMN 22:

Line 24, "$n_e$-1.786)" should read --$n_e$=1.786)--.

COLUMN 25:

Line 61, "(25X25XX1" should read --(25X25X1--.

COLUMN 28:

Line 3, "sand should read --and--.

UNITED STATES PATENT AND TRADEMARK OFFICE
CERTIFICATE OF CORRECTION

PATENT NO. : 5,013,141

DATED : May 7, 1991

INVENTOR(S) : Hajime Sakata

It is certified that error appears in the above-identified patent and that said Letters Patent is hereby corrected as shown below:

<u>COLUMN 30</u>:

Line 14, "st" should read --set--.

Line 30, "filing" should read --filling--.

Line 33, "filing" should read --filling--.

Signed and Sealed this

Nineteenth Day of January, 1993

*Attest:*

DOUGLAS B. COMER

*Attesting Officer*      *Acting Commissioner of Patents and Trademarks*